United States Patent
Maeda et al.

(10) Patent No.: US 9,326,364 B2
(45) Date of Patent: Apr. 26, 2016

(54) ILLUMINATION SYSTEM AND ILLUMINATION DEVICE

(71) Applicant: PANASONIC INTELLECTUAL PROPERTY MANAGEMENT CO., LTD., Osaka (JP)

(72) Inventors: Hikaru Maeda, Osaka (JP); Takahiro Kurihara, Osaka (JP); Tomoaki Mannami, Osaka (JP); Hiroaki Kobayashi, Osaka (JP); Naohiro Toda, Osaka (JP); Kazuhiro Hatta, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/687,043

(22) Filed: Apr. 15, 2015

(65) Prior Publication Data

US 2015/0305126 A1 Oct. 22, 2015

(30) Foreign Application Priority Data

Apr. 17, 2014 (JP) .................. 2014-085916
Apr. 17, 2014 (JP) .................. 2014-085918
Apr. 17, 2014 (JP) .................. 2014-085921

(51) Int. Cl.
*H05B 37/02* (2006.01)

(52) U.S. Cl.
CPC ........ *H05B 37/0281* (2013.01); *H05B 37/0227* (2013.01)

(58) Field of Classification Search
None
See application file for complete search history.

(56) References Cited

U.S. PATENT DOCUMENTS

| 5,079,682 A * | 1/1992 | Roberts .................. G04G 11/00 362/260 |
| 5,327,331 A * | 7/1994 | Roberts .................. G04G 11/00 362/176 |
| 2012/0137406 A1* | 6/2012 | Hide .......................... A61F 9/04 2/206 |
| 2012/0206050 A1* | 8/2012 | Spero ...................... B60Q 1/04 315/152 |
| 2014/0067130 A1* | 3/2014 | Pillai .................. H04L 12/2816 700/275 |

FOREIGN PATENT DOCUMENTS

| JP | 4-264289 | 9/1992 |
| JP | 2008-157774 | 7/2008 |
| JP | 2013-145685 | 7/2013 |

* cited by examiner

*Primary Examiner* — Crystal L Hammond
(74) *Attorney, Agent, or Firm* — Greenblum & Bernstein, P.L.C.

(57) ABSTRACT

An illumination system includes an illumination device, a control unit for controlling a turn-on operation of the illumination device, and a terminal through which manipulation information of the illumination device is inputted by a user. The control unit includes an information extracting unit for extracting illumination information, within a period between a first moment prior to a falling-asleep time of the user and a second moment after a wakeup time of the user, from manipulation information and operation information of the illumination device stored in a memory unit, and an information transceiver unit for transmitting and receiving the illumination information to and the terminal. The terminal includes a terminal transceiver unit for transmitting and receiving the illumination information to and from the control unit, a display unit for displaying the illumination information received through the terminal transceiver unit and an input unit by which the manipulation information is inputted.

31 Claims, 18 Drawing Sheets

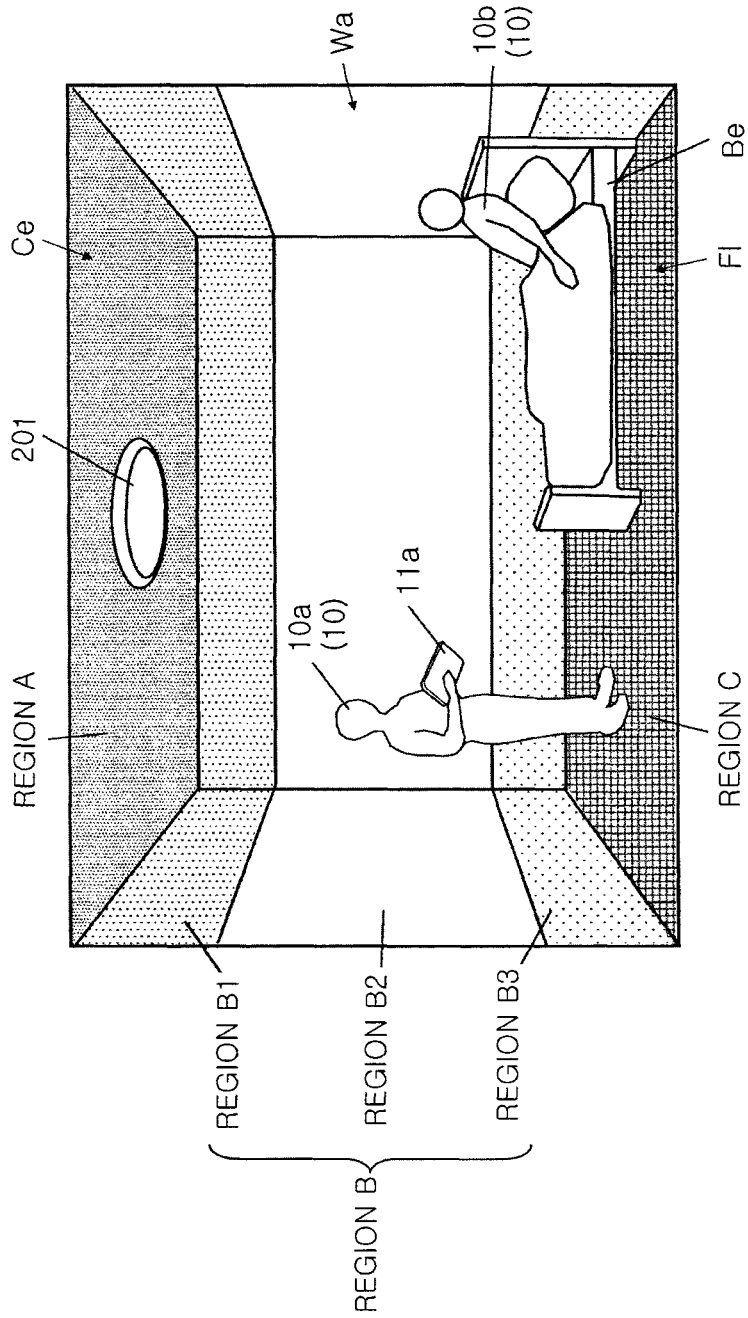

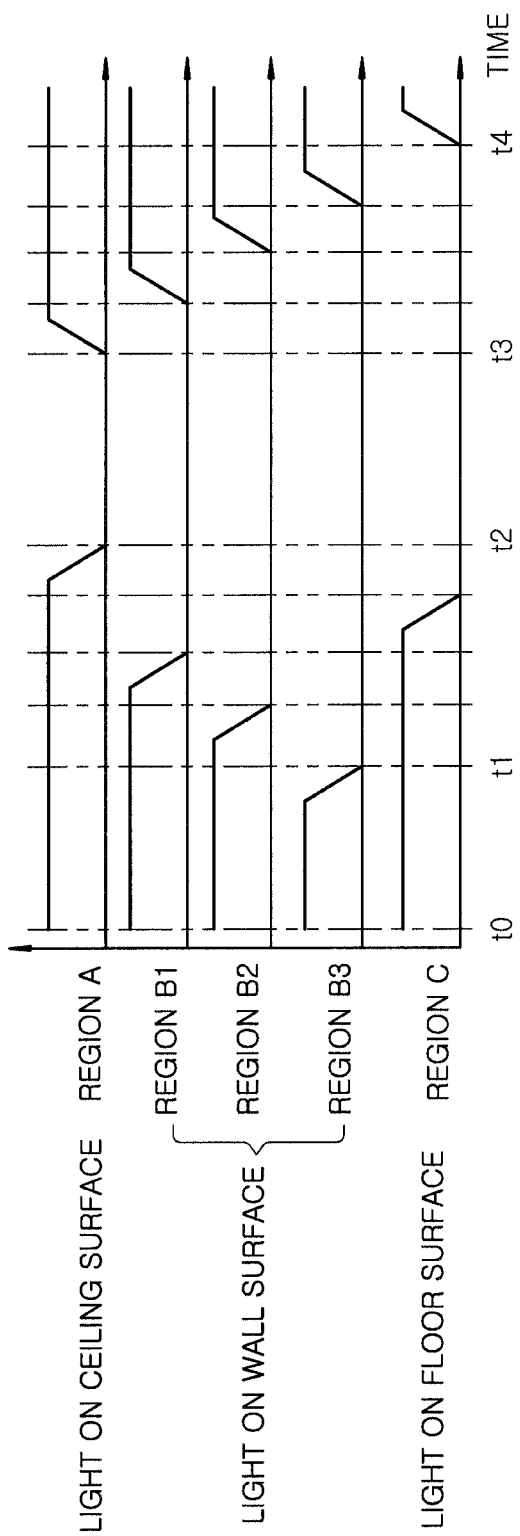

ILLUMINATION SYSTEM AND ILLUMINATION DEVICE

CROSS-REFERENCES TO RELATED APPLICATIONS

This application claims priority to Japanese Patent Application Nos. 2014-085916, 2014-085918 and 2014-085921 filed with the Japan Patent Office on Apr. 17, 2014, the entire contents of which are incorporated herein by reference.

TECHNICAL FIELD

The present disclosure relates to an illumination system capable of realizing illumination environments suitable for a bedtime and a wakeup time

BACKGROUND ART

Conventionally, there is widely used an illumination device such as a ceiling light which is attached to an indoor ceiling surface so as to irradiate light on a general indoor region including a wall surface and a floor surface. Thus far, an annular fluorescent lamp has been generally used as a light source for such an illumination device. In recent years, an LED (Light Emitting Diode) capable of emitting high-brightness light with low electric power is popularly used as a light source. The LED shows a high degree of freedom of arrangement in the illumination device. There is also available an illumination device which makes use of a plurality of LED light sources differing in light distribution.

As one example of the illumination device using the plurality of LED light sources, there is known an illumination device which includes a main light source for irradiating light on a general indoor region mainly including a region below the illumination device and an indirect light source for irradiating light toward a ceiling surface (see, e.g., Japanese Patent Application Publication No. 2013-145685). This illumination device can provide a bright illumination environment suitable for a user's indoor activity by, for example, turning on both the main light source and the indirect light source. Furthermore, the illumination device can reduce the light directly irradiated toward a user and can allow a user to fall asleep under a comfortable and pleasant condition, by turning on only the indirect light source when the user goes to bed.

The aforementioned illumination device enables a user to arbitrarily set a bedtime, a wakeup time and an on-off start time of the illumination device. However, it is difficult for a user to confirm whether the respective times thus set are suitable for the user's own sleep pattern. For that reason, it is sometimes the case that, during a bedtime and a wakeup time, a user cannot sufficiently obtain a comfortable and pleasant illumination environment through the use of the illumination device.

SUMMARY OF THE INVENTION

The present disclosure provides an illumination system which enables a user to confirm illumination environments suitable for a user's own bedtime and a user's own wakeup time and which makes use of an illumination device capable of realizing such illumination environments.

Furthermore, the present disclosure provides an illumination device capable of realizing illumination environments suitable for a user's own bedtime and a user's own wakeup time.

Moreover, the present disclosure provides an illumination device which enables a sleeping person to enjoy a pleasant awakening sense at a scheduled wakeup time.

In accordance with an aspect of the present disclosure, there is provided an illumination system, including: an illumination device configured to irradiate light; a control unit configured to control a turn-on operation of the illumination device; and a terminal through which manipulation information of the illumination device is inputted by a user. The illumination device is configurable in illuminance and color temperature of the irradiated light. The control unit includes a memory unit configured to store the manipulation information and operation information of the illumination device therein, the operation information including the color temperature, illuminance and irradiation time of the illumination device, an information extracting unit configured to extract illumination information, within a period between a first moment prior to a falling-asleep time of the user and a second moment after a wakeup time of the user, from the manipulation information and the operation information of the illumination device stored in the memory unit, and an information transceiver unit configured to transmit and receive the illumination information to and from the terminal. The terminal includes a terminal transceiver unit configured to transmit and receive the illumination information to and from the control unit, a display unit configured to display the illumination information received through the terminal transceiver unit and an input unit by which the manipulation information is inputted.

The display unit may be configured to display at least one of an average value, a median value, a mode value and a cumulative value of the illumination information on the basis of an arbitrary period.

The information extracting unit may be configured to calculate a pre-falling-asleep light quantity, as the illumination information, from the operation information before the falling-asleep time of the user, and the display unit is configured to display the pre-falling-asleep light quantity.

The information extracting unit may be configured to calculate a post-wakeup light quantity, as the illumination information, from the operation information after the wakeup time of the user, and the display unit is configured to display the post-wakeup light quantity.

The control unit may be configured to control the illumination device in a wakeup control mode in which a dimming ratio of the illumination device is gradually increased from a wakeup setting time set by the user, and the display unit is configured to display the wakeup setting time as the illumination information.

The illumination system may further include a sensor unit configured to detect a body motion of the user, and the control unit may determine whether the user is in an awake phase or a sleep phase and the wakeup time of the user based on the body motion of the user detected by the sensor unit The information extracting unit may be configured to extract an awakening comfort level of the user based on a time difference between the wakeup setting time and the wakeup time, and the display unit may be configured to index and display the awakening comfort level as the illumination information.

The information extracting unit may be configured to extract the awakening comfort level based on the number of the body motion detected by the sensor unit during a period ranging from the wakeup setting time to the wakeup time of the user, and the display unit may be configured to index and display the awakening comfort level as the illumination information.

The display unit may be configured to display the wakeup time of the user, as the illumination information.

The control unit may be configured to control the illumination device in a falling-asleep control mode in which a dimming ratio of the illumination device is gradually decreased from a turn-off manipulation time inputted by the user such that the illumination device is turned off at a turn-off time being a predetermined time after the turn-off manipulation time, and the display unit may be configured to display the turn-off time of the illumination device as the illumination information.

The illumination system may further include a sensor unit configured to detect a body motion of the user, and the control unit may determine the falling-asleep time of the user based on the body motion of the user detected by the sensor unit. The information extracting unit may be configured to extract a falling-asleep comfort level of the user during a period ranging from a start time of the falling-asleep control mode to the falling-asleep time of the user, and the display unit may be configured to index and display the falling asleep comfort level as the illumination information.

The control unit may be configured to control the illumination device in a falling-asleep control mode in which a dimming ratio of the illumination device is gradually decreased from a turn-off manipulation time inputted by the user such that the illumination device is turned off at a turn-off time being a predetermined time after the turn-off manipulation time, and the display unit is configured to display, as the illumination information, at least one of the turn-on duration and the turn-on frequency of the illumination device during a period ranging from an end time of the falling-asleep control mode to the wakeup time of the user.

The input unit may allow the user to input a sleep feeling felt at the wakeup time.

The terminal transceiver unit may be connected to an external terminal via the Internet.

In accordance with another aspect of the present disclosure, there is provided an illumination device including: a light source configured to irradiate light; a control unit configured to control a turn-on operation of the light source; and a sound source configured to output a stimulus sound. The illumination device is configured to gradually increase a dimming ratio of the light source in a pre-wakeup period between a predetermined time earlier than a wakeup setting time and the wakeup setting time. The control unit is configured to, during the pre-wakeup period, intermittently execute at least one of light stimulus control in which the dimming ratio of the light source is made higher, for a predetermined period within the pre-wakeup period, than an average dimming ratio in the pre-wakeup period and sound stimulus control in which the sound source is caused to output the stimulus sound.

The light source may be configurable in a color temperature of the light irradiated, and the control unit is configured to cause the light source to irradiate light having an increased color temperature during the light stimulus control.

The light source may include a general light source for irradiating light on an indoor region and a condensing light source for irradiating light on a part of the indoor region, and the color temperature of the light irradiated by the condensing light source may be higher than the color temperature of the light irradiated by the general light source.

The illumination device may further include a sensor unit configured to detect a body motion of a user for the pre-wakeup period, and the control unit may be configured to execute at least one of the light stimulus control and the sound stimulus control when the number of the body motion detected by the sensor unit is less than or equal to a reference value.

The control unit may be configured to change at least one of the dimming ratio of the light source during the light stimulus control, an execution duration of the light stimulus control, and an execution frequency of the light stimulus control depending on the number of body motion detected by the sensor unit.

The control unit may be configured to change at least one of the output of the stimulus sound during the sound stimulus control, an execution duration of the sound stimulus control, and an execution frequency of the sound stimulus control depending on the number of the body motion detected by the sensor unit.

In accordance with still another aspect of the disclosure, there is provided an illumination device including: a light source configured to irradiate light; and a control unit configured to control a turn-on operation of the light source. The illumination device is configured to gradually increase a dimming ratio of the light source in a pre-wakeup period between a predetermined time earlier than a wakeup setting time and the wakeup setting time. The control unit is configured to, during the pre-wakeup period, intermittently execute light stimulus control in which the dimming ratio of the light source is made higher, for a predetermined period within the pre-wakeup period, than an average dimming ratio in the pre-wakeup period.

In accordance with still another aspect of the present disclosure, there is provided an illumination device including: a device body attached to an installation surface of an indoor area; a plurality of light sources provided in the device body; and a control unit configured to control dimming ratios of the light sources. The control unit is configured to control turn-on operations of the light sources so as to individually irradiate light on a first region including an indoor ceiling surface, a second region including a wall surface and a third region including a floor surface, pursuant to a predetermined time schedule.

The light sources may include an indirect light source for irradiating light on the first region, a general light source for irradiating light on the second region, and a condensing light source for irradiating light on the third region.

During a bedtime period ranging from a user entry time at which the user enters a bedroom to a predetermined turn-off time, the control unit may turn off the general light source and the condensing light source prior to turning off the indirect light source.

The control unit may be configured to turn off the general light source prior to turning off the condensing light source.

During a wake-up period ranging from a predetermined illumination start time to a user wakeup time, the control unit may turn on the indirect light source, the general light source and the condensing light source in this order.

The general light source may be configured to irradiate light on a plurality of regions defined by dividing the second region.

The plurality of regions may include a first sub-region adjoining the ceiling surface, a second sub-region including an average sight-line height obtained when the user is upright, and a third sub-region adjoining the floor surface.

During a bedtime period ranging from a user entry time at which the user enters a bedroom to a predetermined turn-off time, the control unit may stop irradiation of light from the general light source on the third sub-region, the second sub-region and the first sub-region in this order.

During a wake-up period ranging from a predetermined illumination start time to a user wakeup time, the control unit may allow light from the general light source to be irradiated on the first sub-region, the second sub-region and the third sub-region in this order.

The color temperature of the light irradiated by the indirect light source may be lower than the color temperature of the light irradiated by each of the general light source and the condensing light source.

The light sources may be configurable in their color temperatures of the light irradiated, and the control unit may be configured to, during a wakeup period ranging from a predetermined illumination start time to a user wakeup time, cause the light sources to irradiate light having the color temperatures higher than those of the light irradiated during a bedtime period ranging from a user entry time at which the user enters a bedroom to a predetermined turn-off time.

With such configurations, the operation information of the illumination device, the on-off information of the illumination device, and the illumination information during a period between a time before a user falls asleep and a time after a user wakes up, are displayed on the display unit of the terminal. This enables a user to confirm and realize the illumination environments suitable for a user's own bedtime and a user's own wakeup time.

Further, even if a person is deeply sleeping, the sleep of the person can be made shallow by the light stimulus control or the sound stimulus control in the pre-wakeup period. Accordingly, the person can wake up with a pleasant feeling at the predetermined wakeup setting time.

In addition, the light sources are controlled to individually irradiate light on the first region including the indoor ceiling surface, the second region including the wall surface and the third region including the floor surface, pursuant to the predetermined time schedule. Accordingly, it is possible to realize illumination environments suitable for a user's own bedtime and a user's own wakeup time.

BRIEF DESCRIPTION OF THE DRAWINGS

FIG. 12 is a view showing an indoor area to which an illumination device according to a third embodiment of the present invention is attached.

FIG. 17 is a view showing an operation example of the illumination device.

DETAILED DESCRIPTION OF THE EMBODIMENTS

Figure 1:
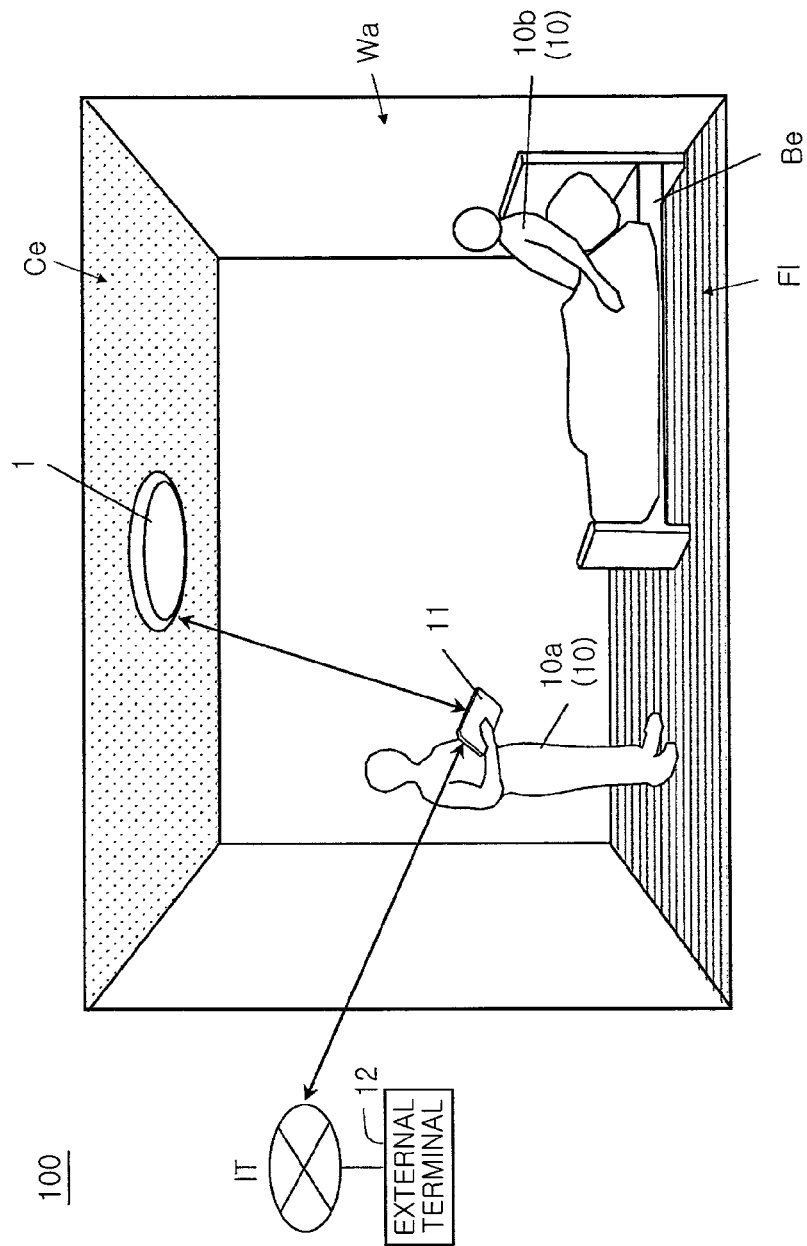
FIG. 1 is a view showing an indoor area to which an illumination system according to a first embodiment of the present invention is applied.

An illumination system 100 according to a first embodiment of the present invention will now be described with reference to FIGS. 1 to 7. As shown in FIG. 1, the illumination system 100 of the present embodiment includes a ceiling-light-type illumination device 1 attached to a ceiling surface Ce (or an installation surface). As illustrated in FIG. 1, the illumination device 1 is suitably used in a bedroom where a bed Be is positioned. The illumination device 1 irradiates light on general indoor regions including a wall surface Wa and a floor surface F1.

The turn-on operation of the illumination device 1 can be controlled by a user 10 (10a or 10b) who manipulates a terminal 11. The illumination device 1 of the present embodiment may be realized by an illumination device other than a ceiling light. Furthermore, the illumination device 1 may be realized by, e.g., a base-light, a down-light or a spotlight, as long as they can irradiate light on the respective regions mentioned above. The terminal 11 may be a remote controller dedicated to the illumination device 1 or may be an information communication terminal such as a smartphone or a tablet terminal. The terminal 11 is connected to an external terminal 12 such as an external server or the like via the Internet IT.

Figure 2A:
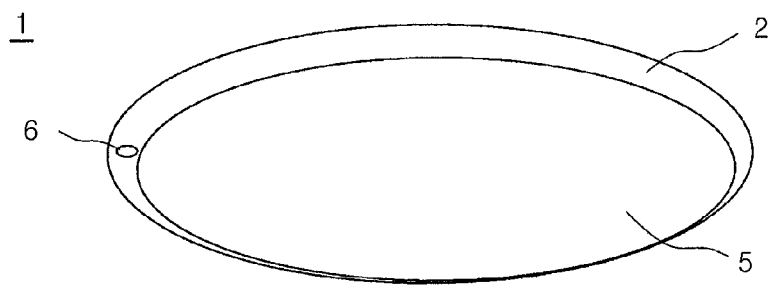
FIG. 2A is a perspective view of an illumination device employed in the illumination system.
Figure 2B:
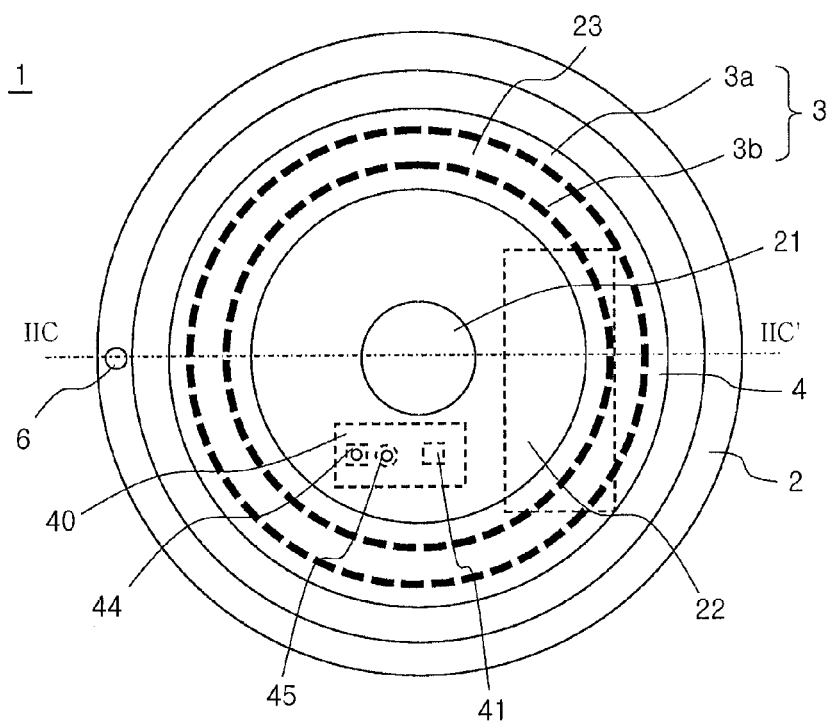
FIG. 2B is a bottom view of the illumination device with a cover thereof removed.
Figure 2C:
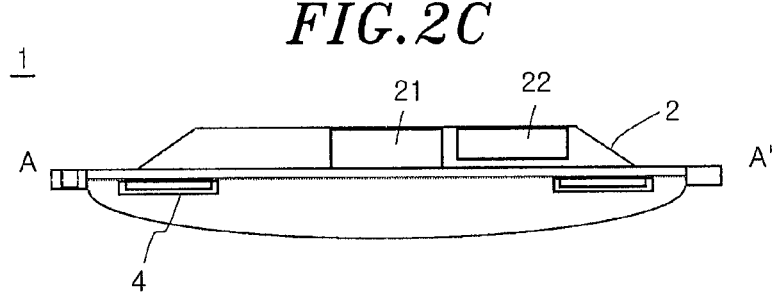
FIG. 2C is a side sectional view taken along line IIC-IIC' in FIG. 2B.

As shown in FIGS. 2A to 2C, the illumination device 1 includes a device body 2, a light source 3 disposed in a ring shape about the center of the device body 2, and an optical member 4 provided at the light emission side of the light source 3 and configured to control distribution of the light emitted from the light source 3. The illumination device 1 further includes a diffusion member (cover) 5 provided at the light emission side of the optical member 4 and configured to diffuse and radiate the light emitted from the optical member 4.

The light source 3 is formed of two concentric lines of LED groups 3a and 3b, each of which includes a plurality of LEDs disposed in a ring shape. The outer peripheral LED group 3a is composed of LED chips which irradiate light having a relatively-high color temperature. The inner peripheral LED groups 3b is composed of LED chips which irradiate light having a relatively-low color temperature. In the present embodiment, a configuration in which two lines of LED groups are disposed is illustrated as the light source 3. However, the present invention is not limited thereto. Alternatively, it may be possible to use one line of LED group or three or more lines of LED groups. Each of the LED groups may be a fluorescent-lamp-type LED illumination device including LEDs accommodated therein.

The LEDs of the light source 3 are covered with a wavelength converting material which converts the wavelength of the light emitted from LED chips and are formed into LED packages. For example, GaN-based blue LED chips which emit blue light are used as the LED chips. A mixture of a seal-purpose light-transmitting resin material and a phosphor for the emission of light having a neutral white color or a light bulb color is used as the wavelength converting material. The color temperature of the light irradiated from the light source 3 may range from a daylight color to a light bulb color (from 7,100K to 2,600K). LED chips which emit light of a daylight color having a color temperature of, e.g., about 6,500K, are suitably used as the LED group 3a which irradiates light having a relatively-high color temperature. LED chips which emit light of a light bulb color having a color temperature of, e.g., about 2,700K, are suitably used as the LED group 3b which irradiates light having a relatively-low color temperature. By controlling the dimming ratio of the LED groups 3a and 3b, the light source 3 can appropriately change the color temperature of the irradiated light.

The device body 2 is a plate-like member having a circular top-view shape, which is attached to the ceiling surface Ce with the upper surface (attachment surface) thereof facing the ceiling surface Ce. Examples of the device body 2 include a die-cast member having a small thickness and a member formed of an iron plate, an aluminum pate or the like and one-piece molded into a specified shape. A mounting bracket (not shown) is provided in the central region of the upper surface of the device body 2 and is connected to a ceiling hook or the like installed on the ceiling surface Ce. The light source 3 is disposed on the opposite surface of the device body 2 from the ceiling surface Ce.

A power supply unit 21 fixed to a power supply connector provided on an installation surface is disposed in the central portion of the device body 2. A lighting circuit 22 for turning on the light source 3 and a substrate 23 for mounting the LEDs of the light source 3 are provided at the outer peripheral side of the power supply unit 21. The device body 2 is formed by pressing and cutting a plate such as an aluminum plate or a steel plate having a specified rigidity into the aforementioned shape. A white paint having high visible-light reflectivity may be coated, or a reflective metallic material may be vapor-deposited, on the surface of the device body 2 on which the LEDs are disposed.

The power supply unit 21 is a general-purpose adaptor guide and is connected to a commercial AC power source via a power supply connector or the like. The lighting circuit 22 includes a voltage transformer, a capacitor and a control IC, which convert and rectify an AC current supplied from the power supply unit 21 into a DC current having a specified voltage suitable for the light source 3.

The substrate 23 is made of an insulating material such as glass epoxy resin or the like. Specified wiring patterns are formed on the surface of the substrate 23 on which the light source 3 is mounted. The substrate 23 may be a resin-based substrate, a ceramic-made substrate or a substrate based on metal such as aluminum or the like. In addition, a flexible substrate or the like may be used as the substrate 23.

The lighting circuit 22 is configured to independently turn on the outer peripheral LED group 3a and the inner peripheral LED group 3b in response to a user's manipulation. The LEDs of the respective LED groups 3a and 3b may be divided one by one or into a plurality of groups so that partial lighting or selective lighting can be performed.

A control unit 40 for controlling a turn-on operation of the light source 3 is provided in the substrate 23. Responsive to a wireless signal received from the terminal 11, the control unit 40 turns on or off the light source 3. The term "wireless" used herein includes infrared rays, electric waves and visible light. The control unit 40 performs dimming control of the light source 3 using, e.g., PWM (Pulse Width Modulation) control or analog dimming control. The control unit 40 includes a microcomputer 41. The term "dimming ratio" used herein means a ratio of brightness to the maximum brightness of the light source 3. For example, if the control unit 40 performs dimming control of the light source 3 using PWM control, the dimming ratio is decided by a duty ratio of a PWM signal.

A sensor unit 6 for detecting a motion of a person in an indoor area provided with the illumination device 1 is installed in the outer periphery of the device body 2. The sensor unit 6 may be installed independently of the illumination device 1. The sensor unit 6 is configured by, e.g., a motion sensor. The sensor unit 6 detects a body motion during sleep such as rolling-over or other motions of a sleeping person (or a user 10) (see FIG. 1), thereby detecting the depth of sleep of the user 10. The control unit 40 determines that the sleep is shallow if the body motion of the sleeping person detected by the sensor unit 6 is frequent, i.e., if the number of the body motions of the sleeping person detected by the sensor unit 6 during a predetermined period is greater than a reference value. Further, the control unit determines that the sleep is deep if the body motion is infrequent, i.e., if the number of the body motions of the sleeping person detected by the sensor unit 6 during the predetermined period is less than or equal to the reference value. Moreover, the sensor unit 6 can detect the falling-asleep time of the user 10 from the motion of the user 10.

The optical member 4 is a trough-shaped lens member which covers all the LEDs of the light source 3 disposed in a ring shape. The optical member 4 is made of a light-transmitting resin such as an acryl resin or the like. In the present embodiment, the optical member 4 is formed of semi-circular trough-shaped lens members which cover both the outer peripheral LED group 3a and the inner peripheral LED group 3b of the light source 3.

The cover 5 is formed into a dome shape so as to cover the front surface of the device body 2 and is made of, e.g., a resin material obtained by adding light-diffusing particles or a pigment to a light-transmitting material such as an acryl resin or the like. Instead of adding the light-diffusing particles or the pigment, the cover 5 may be formed by subjecting the front surface or the rear surface of a glass substrate or a resin substrate to a sandblast process so as to become a rough surface, subjecting the front surface or the rear surface of a glass substrate or a resin substrate to a surface texturing process, or subjecting the front surface or the rear surface of a glass substrate or a resin substrate to a dimple forming process so as to form fine irregularities.

Figure 3:
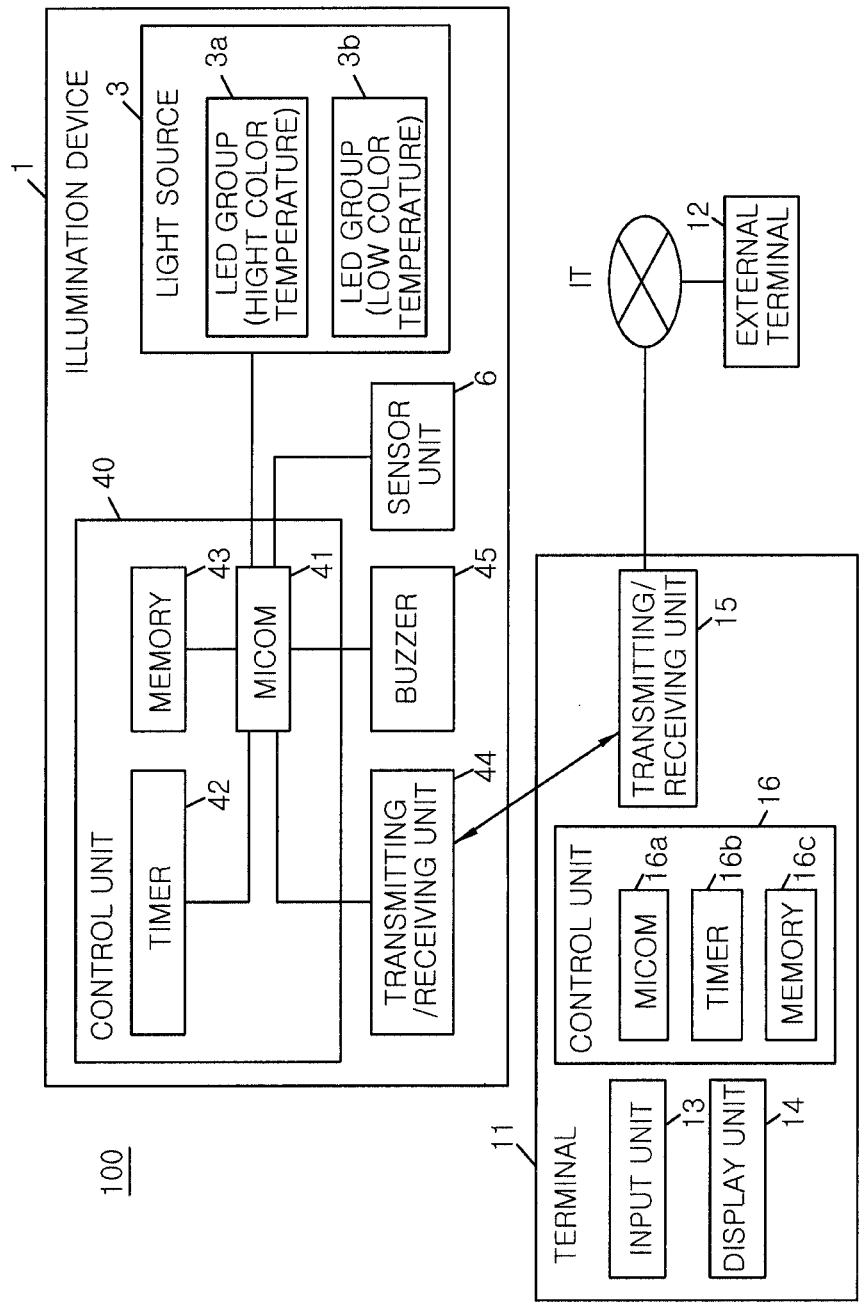
FIG. 3 is a block diagram of the illumination system.

As shown in FIG. 3, the control unit 40 includes a timer 42 for counting a time and a memory 43 for storing data such as the dimming ratio of the light source 3 for the time counted by the timer 42 and the past illumination information. The illumination device 1 further includes a transceiver unit 44 for transmitting and receiving a control signal or other signals to and from the terminal 11 and a buzzer 45 for outputting a dial tone upon receiving a signal. The buzzer 45 outputs not only the dial tone but also an arousal stimulus sound which urges awakening of a sleeping person.

The terminal 11 includes an input unit 13 for setting a dimming mode of the illumination device 1 at a bedtime and a wakeup time, a display unit 14 for displaying an input content, and a transceiver unit 15 (or a terminal transceiver unit) for making communication with the illumination device 1. The input unit 13 is an input interface and is configured by, e.g., a push-button-type switch or a touch panel. The transceiver unit 15 performs communication using, e.g., an infrared communication method, a communication method of ZigBee (registered trademark) which is one of standards of WPAN (Wireless Personal Area Network), or other communication methods. The terminal 11 further includes a control unit 16 which accommodates therein a microcomputer 16a for controlling the respective components mentioned above, a timer 16b and a memory 16c.

As the user 10 manipulates the terminal 11, the illumination device 1 executes a wakeup control mode in which the dimming ratio of the light source 3 is gradually increased at the wakeup time of the user 10 and a falling-asleep control mode in which the dimming ratio of the light source 3 is gradually reduced at the bedtime of the user 10 such that the illumination device 1 is turned off after a predetermined time.

The illumination device 1 further includes an information extracting unit (the microcomputer 41) for extracting the illumination information during a period between a time before the falling-asleep of the user 10 and a time after the wakeup of the user 10 from manipulation information of the terminal 11 and operation information (including a color temperature, illuminance, irradiation time and the like) of the illumination device 1 which are stored in the memory 43. The transceiver unit 44 serves as an information transceiver unit for transmitting and receiving the illumination information to and from the terminal 11. The operation of the illumination system 100 to be described later may be controlled by the control unit 16 of the terminal 11 rather than the control unit 40 of the illumination device 1.

Figure 4:
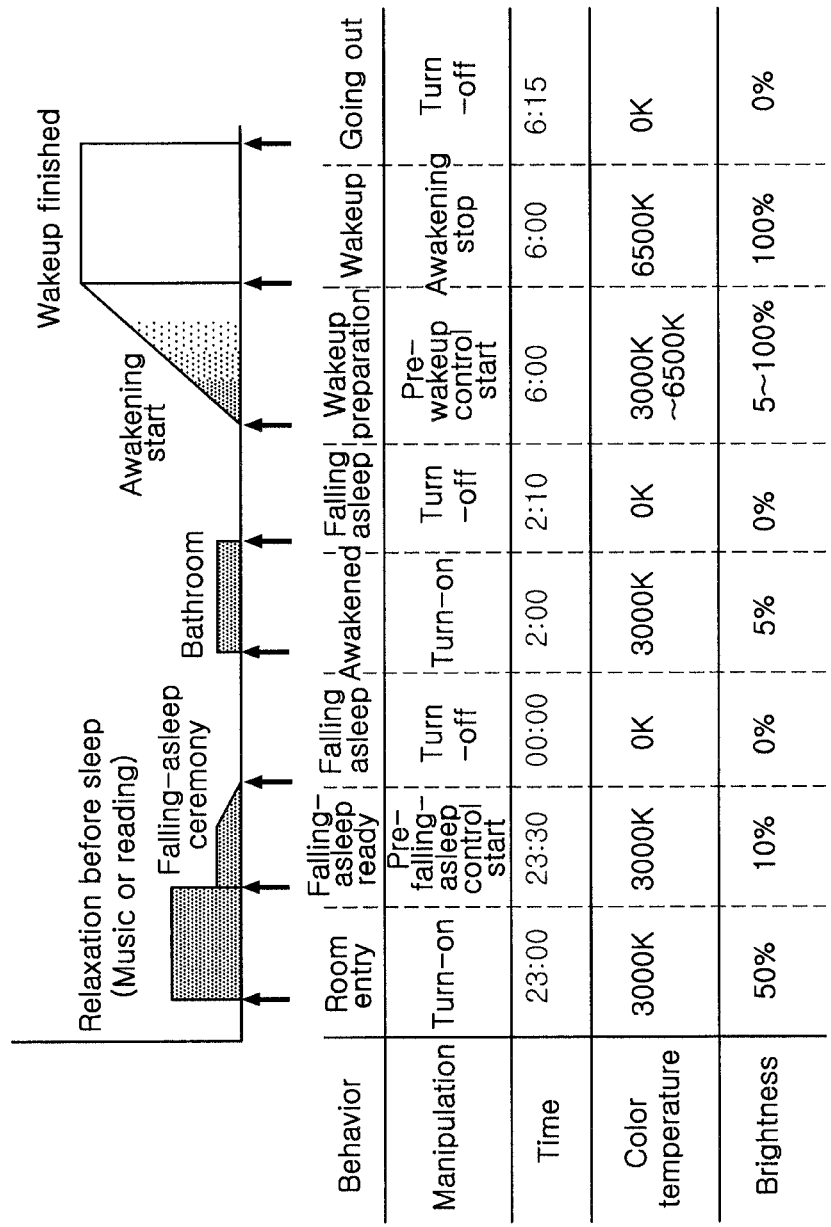
FIG. 4 is a view showing the illumination information in the indoor area to which the illumination system is applied.

As the user 10 performs a behavior of turning on or turning off the illumination device 1 in daily life, it is possible to obtain various kinds of illumination information on the user 10. For example, if the user 10 enters a bedroom at night as shown in FIG. 4 and if the user 10 turns on the illumination device 1 using the terminal 11, the turn-on manipulation and the manipulation time (e.g., 23:00) are obtained as the illumination information. Furthermore, if the user 10 turns on the illumination device 1 at a specified color temperature (e.g., 3,000K) and a specified dimming ratio (e.g., 50%) to listen to music or read a book before sleeping, the color temperature and the dimming ratio of the illumination environment available at that time can be obtained as the illumination information. Moreover, if the user inputs the falling-asleep control mode, it is possible to obtain the input manipulation time (e.g., 23:30), the dimming ratio (e.g., 10%) in the falling-asleep control mode and the predetermined turn-off time (e.g., 0:00) as the illumination information. In addition, if the user 10 temporarily restores consciousness to go to a bathroom and if the user 10 turns on the illumination device 1, it is possible to obtain the time (e.g., 2:00), the color temperature (e.g., 3,000K) and the dimming ratio (e.g., 5%) available at that time, as the illumination information.

If the user 10 sets the wakeup control mode in advance, the startup time of the wakeup control mode (e.g., 6:00), the color temperature (e.g., 3,000K to 6,500K) and the dimming ratio (e.g., 5%) can be obtained as the illumination information. In reality, even when the user 10 wakes up or comes out of a bedroom, it is possible to obtain the illumination information mentioned above.

Figure 5:
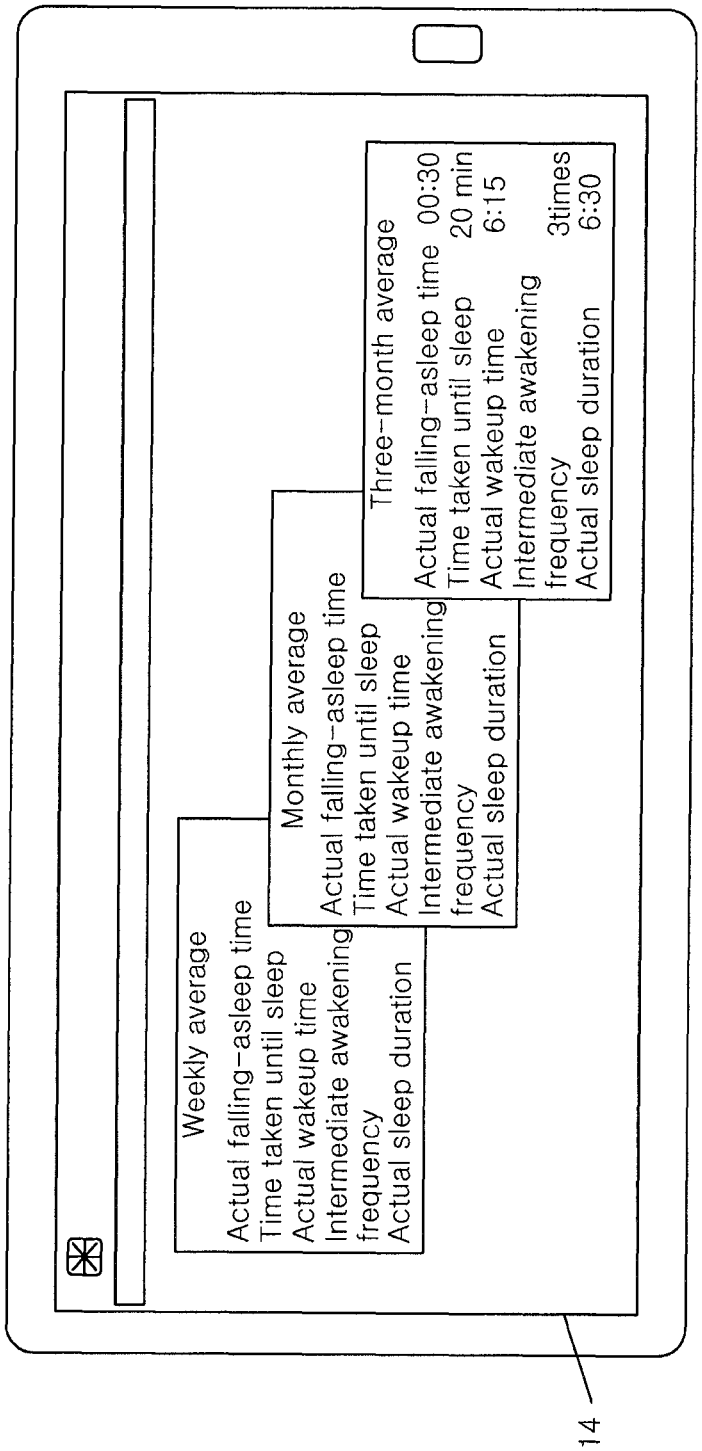
FIG. 5 is a view showing a display example of a terminal employed in the illumination system.

In the present embodiment, the aforementioned illumination information is displayed on the display unit 14 of the terminal 11 as shown in FIG. 5. Thus, the user 10 can confirm the bedtime or the wakeup time of the user 10 and the turn-on or turn-off start time of the illumination device. By performing the aforementioned setting with reference to the bedtime or the wakeup time of the user 10 and the turn-on or turn-off start time of the illumination device, the user 10 can realize an illumination environment suitable for the user's own bedtime and the wakeup time. The display unit 14 can display at least one of an average value, a median value, a mode value and a cumulative value of the illumination information on the basis of an arbitrary period, e.g., on a weekly basis, a monthly basis or a three-month basis. In the present embodiment, there is illustrated an average value. Thus, the user 10 can grasp the own lifestyle and the trend thereof. This assists in improving the lifestyle of the user 10.

Figure 6:
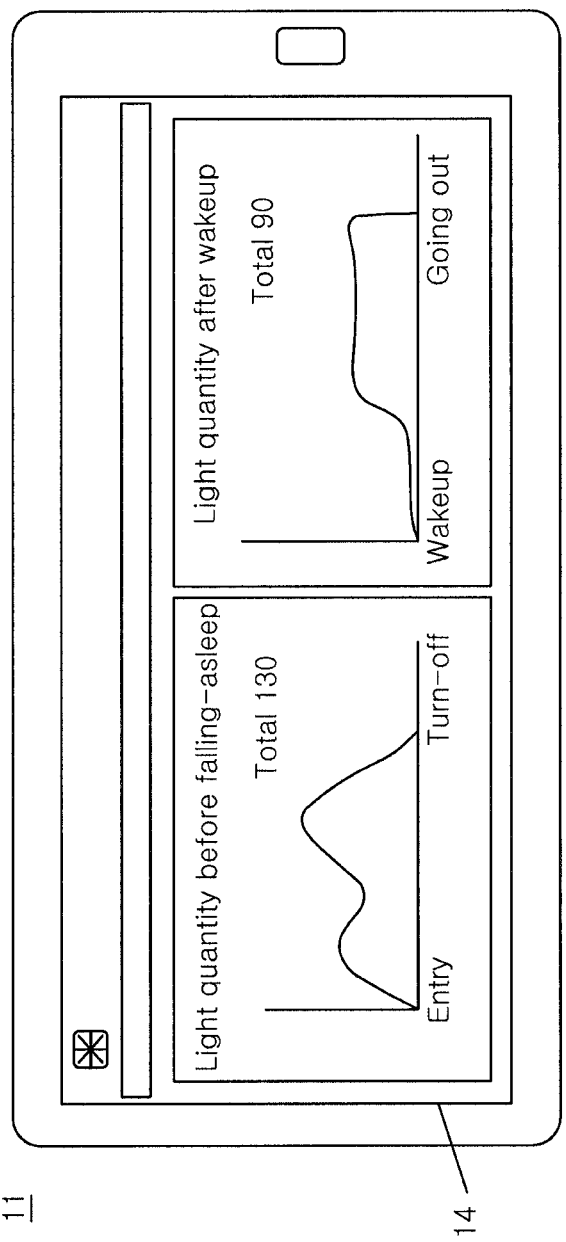
FIG. 6 is a view showing a display example of the terminal employed in the illumination system.

The information extracting unit (the microcomputer 41) calculates a pre-falling-asleep light quantity as the illumination information from the color temperature, illuminance and irradiation time of the illumination device 1 available before the user 10 falls asleep. As shown in FIG. 6, the display unit 14 displays the pre-falling-asleep light quantity thus calculated. The pre-falling-asleep light quantity is calculated by adding up the color temperature, the illuminance and the irradiation time available during the aforementioned period. In this way, the user 10 quantifies the inappropriate light irradiated on the user 10 before the user 10 falls asleep. Thus, the user 10 can reduce the quantity of the inappropriate light. This helps shorten the time required for the user 10 to fall asleep.

Furthermore, The information extracting unit calculates a post-wakeup light quantity as the illumination information from the color temperature, illuminance and irradiation time of the illumination device 1 available after the user 10 wakes up. As shown in FIG. 6, the display unit 14 displays the post-wakeup light quantity thus calculated. The post-wakeup light quantity is also calculated by adding up the color temperature, the illuminance and the irradiation time available during the aforementioned period. The user 10 quantifies the consciousness-waking light irradiated on the user 10 after the user 10 wakes up. Thus, the user 10 can increase the quantity of the consciousness-waking light. This helps increase an awakening sense after the user 10 leaves a bedroom.

The display unit 14 displays the wakeup setting time in the wakeup control mode. The wakeup setting time is displayed in terms of an average value not only on a day-by-day basis but also on an arbitrary period basis. This enables the user 10 to know a difference in wakeup time between weekdays and holidays. This helps maintain a sleep rhythm.

Figure 7:
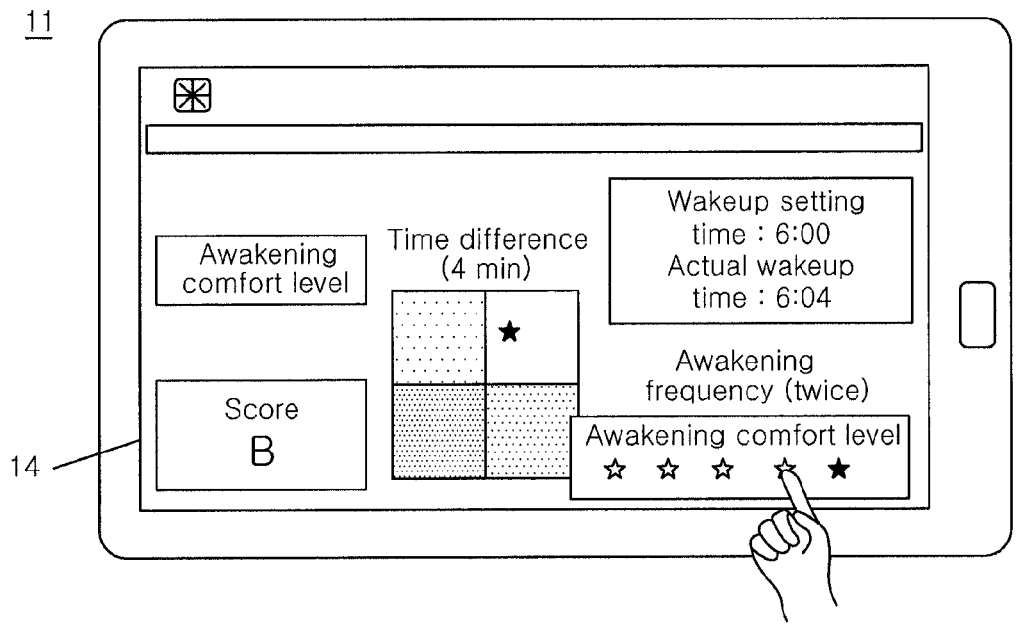
FIG. 7 is a view showing a display example of the terminal employed in the illumination system.

The sensor unit 6 detects a body motion during the sleep of the user 10, and the control unit 40 determines whether the user 10 is in an awake phase or a sleep phase and the wakeup time of the user 10 based on the body motion detected by the sensor unit 6. The information extracting unit extracts an awakening comfort level of the user 10 from a time difference between the wakeup setting time and the wakeup time of the user 10 detected by the sensor unit 6. As shown in FIG. 7, the display unit 14 indexes and displays the comfort level thus extracted. In addition, the information extracting unit extracts a comfort level based on the number of the body motions detected by the sensor unit 6 until the user 10 wakes up in the wakeup control mode. The display unit 14 indexes and displays the comfort level thus extracted. As illustrated in FIG. 7, the display unit 14 displays the comfort level on coordinates and displays a pleasant sleep score stepwise (e.g., at an evaluation value of from A to E) depending on the position of the comfort level on the coordinates. Thus, user 10 can index the smooth awakening based on the difference between the wakeup setting time and the actual awakening time or the shallowness of sleep. Furthermore, the user 10 can achieve pleasant awakening by adjusting the wakeup control mode. At this time, the display unit 14 displays the wakeup setting time and the actual wakeup time. This helps the user to maintain a sleep rhythm.

In the falling-asleep control mode, the display unit displays the turn-off time (not shown) of the illumination device 1 as the illumination information by averaging the turn-off time in a specified period. If the sensor unit 6 detects the sleep of the user 10, the information extracting unit extracts a falling-asleep comfort level (not shown) of the user 10 from the time taken from the start time of the falling-asleep control mode to the falling-asleep time of the user 10 detected by the sensor unit 6. As shown in FIG. 5, the display unit 14 may display an average value of the actual falling-asleep time. This enables the user 10 to roughly know the average of the time required for the user 10 to fall asleep. This helps the user 10 to review how to spend time before the user 10 falls asleep, and to secure the real sleep time. In addition, the display unit 14 displays the turn-on duration or the turn-on frequency of the illumination device 1 during a period ranging from the end time of the falling-asleep control mode to the wakeup time of the user 10 (see FIG. 5).

The input unit 13 of the terminal 11 is configured to enable the user 10 to input a sleep feeling like a awakening mood felt at the wake-up time. For example, as shown in FIG. 7, the awakening comfort level (e.g., the five-stage evaluation using stars in FIG. 7) can be inputted through the input unit 13. By comparing the comfort level and the illumination information, the user 10 can clearly know the relationship between the falling-asleep/wakeup feeling and the illumination environment.

The transceiver unit 15 of the terminal 11 is connected to the external terminal 12 via the Internet IT. Thus, the illumination system 100 can be connected to various kinds of networks or cloud systems. This enables different users to compare and refer to the information. It may also be possible to introduce a service which executes the setting or advising of a target value on the illumination information, e.g., the setting of a color temperature in the falling-asleep control mode.

The present invention is not limited to the embodiment described above but may be differently modified. In the embodiment described above, there has been illustrated a configuration example in which the body motion of the user 10 is detected by the sensor unit 6 to determine the falling-asleep and the wakeup of the user 10. However, the sensor unit 6 is not necessarily limited to the motion sensor. As an alternative example, the motion of the user 10 may be detected by a sound sensor. Even if the sensor unit 6 does not exist, the information on the sleeping state of the user 10 or the like can be acquired by detecting an operation of turning on or turning off a pillow light, an operation of stopping the alarm of an alarm clock, or an operation in which the user 10 manipulates an electric device during a period from the sleep to the wakeup using a so-called snooze function. In the embodiment described above, there has been illustrated a configuration in which the LEDs are used as the light source 3. Instead of using the LEDs, it may be possible to use a module configured by solid light-emitting elements other than the LEDs, such as an organic EL element (OLED) or an inorganic EL element. In the embodiment described above, there has been illustrated the illumination system 100 which makes use of the illumination device 1 installed in a bedroom. Alternatively, the illumination device may be, e.g., a living room light or a corridor light, as long as it is possible to grasp the behavior pattern of the user from the manipulation information and the operation information of the illumination device and to disclose suitable illumination information depending on the behavior pattern of the user.

Figure 8:
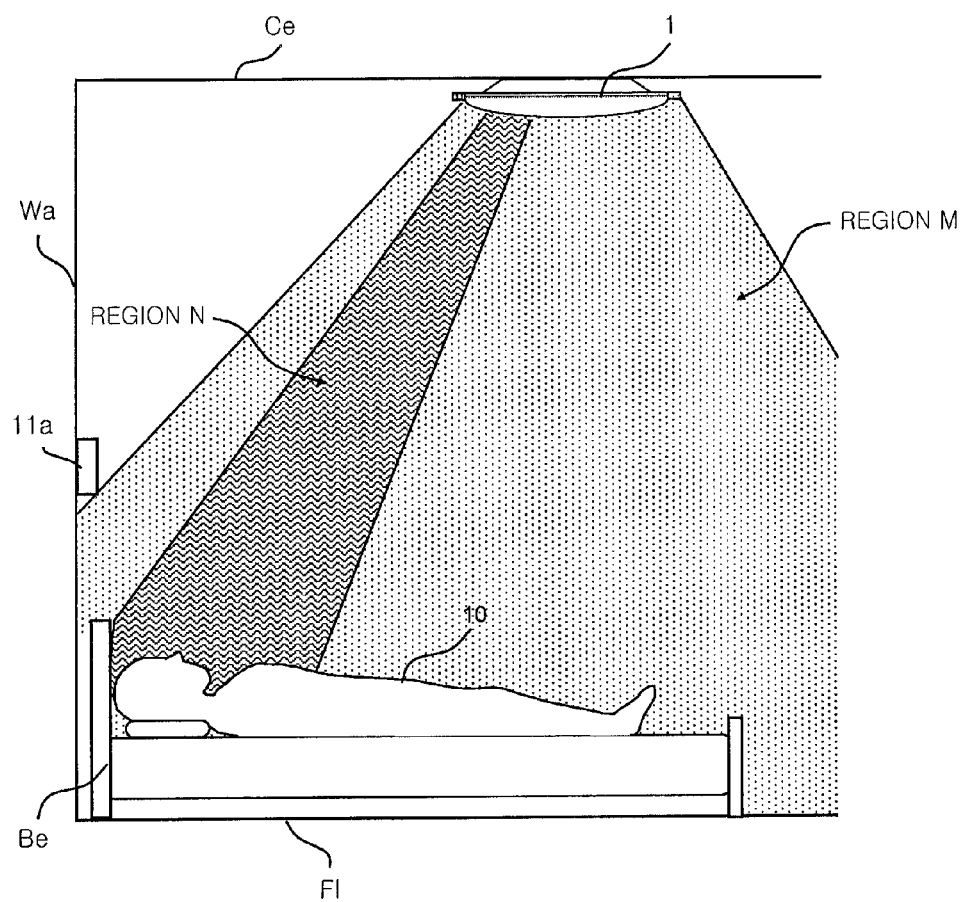
FIG. 8 is a view showing an indoor area to which an illumination device according to a second embodiment of the present invention is attached.

An illumination device according to a second embodiment of the present invention will now be described with reference to FIGS. 8 to 11. Components identical with those of the first embodiment will be designated by like reference symbols with no detailed description made thereon. As shown in FIG. 8, the illumination device 101 of the present embodiment is a ceiling-light-type illumination device attached to a ceiling surface Ce (or an installation surface). As illustrated in FIG. 8, the illumination device 101 is suitably used in a bedroom where a bed Be is positioned. The illumination device 101 irradiates light on a general indoor region M including a ceiling surface Ce and a wall surface Wa and a specific region N including the face of a sleeping person (a user 10) who sleeps on the bed Be.

The turn-on operation of the illumination device 101 can be controlled by the user 10 who manipulates a remote controller 11*a*. The illumination device 101 of the present embodiment may be realized by an illumination device other than a ceiling light. The illumination device 101 may be realized by, e.g., a base-light, a down-light or a spotlight, as long as they can irradiate light on the respective regions mentioned above.

Figure 9A:
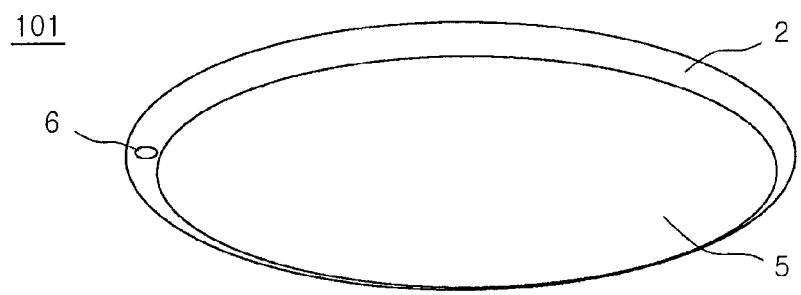
FIG. 9A is a perspective view of the illumination device.
Figure 9B:
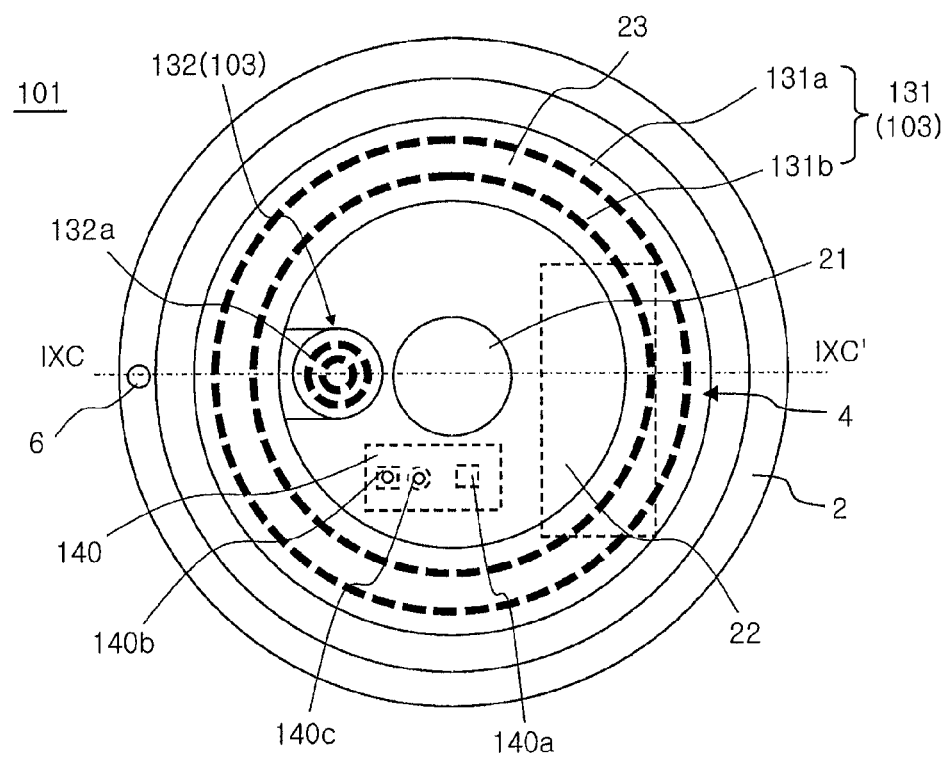
FIG. 9B is a bottom view of the illumination device with a cover thereof removed.
Figure 9C:
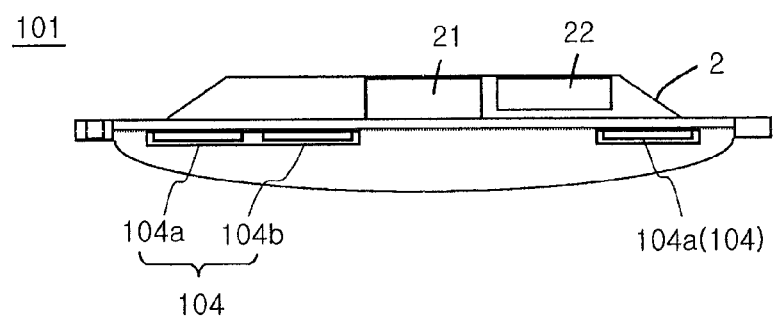
FIG. 9C is a side sectional view taken along line IXC-IXC' in FIG. 9B.

As shown in FIGS. 9A to 9C, the illumination device 101 includes a device body 2, a plurality of light sources 103 disposed in a ring shape about the center of the device body 2, and an optical member 104 provided at the light emission side of the light sources 103 and configured to control distribution of the light emitted from the light sources 103. The illumination device 101 further includes a diffusion member (cover) 5 provided at the light emission side of the optical member 104 and configured to diffuse and radiate the light emitted from the optical member 104.

The light sources 103 includes a general light source 131 for irradiating light on the general indoor region M and a condensing light source 132 for irradiating a specific region N. The general light source 131 is formed of two concentric lines of LED groups 131*a* and 131*b*, each of which includes a plurality of LEDs disposed in a ring shape. The outer peripheral LED group 131*a* is composed of LED chips which irradiate light having a relatively-high color temperature. The inner peripheral LED groups 131*b* is composed of LED chips which irradiate light having a relatively-low color temperature. In the present embodiment, a configuration in which two lines of LED groups are disposed is illustrated as the light source 103. However, the present invention is not limited thereto. Alternatively, it may be possible to use one line of LED group or three or more lines of LED groups. Each of the LED groups may be a fluorescent-lamp-type LED illumination device including LEDs accommodated therein.

The LEDs of the respective light sources 103 are identical in configuration with the LEDs of the first embodiment. Therefore, no description will be made thereon. The color temperature of the light irradiated from the general light source 131 and the condensing light source 132 may range from a daylight color to a light bulb color (from 7,100K to 2,600K). In the general light source 131, LED chips which emit light of a neutral white color having a color temperature of, e.g., about 5,000K, are suitably used as the LED group 131*a* which irradiates light having a relatively-high color temperature. Furthermore, LED chips which emit light of a light bulb color having a color temperature of, e.g., about 2,700K to 3,000K, are suitably used as the LED group 131*b* which irradiates light having a relatively-low color temperature. By controlling the dimming ratio of the LED groups 131*a* and 131*b*, the general light source 131 can appropriately change the color temperature of the irradiated light. Moreover, LED chips which emit light of a daylight color having a color temperature of 5,200K or higher, e.g., 6,500K, are suitably used as the LEDs of the condensing light source 132.

The device body 2 is identical in configuration with that of the first embodiment. Therefore, no description will be made thereon.

A control unit 140 for controlling a turn-on operation of the light sources 103 is provided in the substrate 23. Responsive to a wireless signal received from the remote controller 11a, the control unit 140 turns on or off the light sources 103. The term "wireless" used herein includes infrared rays, electric waves and visible light. The control unit 140 performs dimming control of the light sources 103 using, e.g., PWM (Pulse Width Modulation) control or analog dimming control. The control unit 140 is realized by a microcomputer 140a. The term "dimming ratio" used herein means a ratio of brightness to the maximum brightness of the light sources 103. For example, if the control unit 140 performs dimming control of the light sources 103 using PWM control, the dimming ratio is decided by a duty ratio of a PWM signal.

The microcomputer 140a includes a timer for counting a time and a memory for storing data such as the dimming ratios of the respective light sources 103 for the time counted by the timer or the like and the past illumination information. The control unit 140 includes a transceiver unit 140b for transmitting and receiving a control signal to and from the remote controller 11a and a buzzer 140c for outputting a dial tone upon receiving a signal. The buzzer 140c outputs not only the dial tone but also a stimulus sound which shallows the sleep of a sleeping person.

A sensor unit 6 for detecting a motion of a person in an indoor area provided with the illumination device 101 is installed in the outer periphery of the device body 2. The sensor unit 6 is identical in configuration with that of the first embodiment. The sensor unit 6 may be installed independently of the illumination device 101. The sensor unit 6 is configured by, e.g., a motion sensor. The sensor unit 6 detects a body motion during sleep such as rolling-over or other motions of a sleeping person (or a user 10) (see FIG. 8), thereby detecting the depth of sleep of the user 10. The control unit 40 determines that the sleep is shallow if the body motion of the sleeping person detected by the sensor unit 6 is frequent, i.e., if the number of the body motions of the sleeping person detected by the sensor unit 6 during a predetermined period is greater than a reference value. Further, the control unit determines that the sleep is deep if the body motion is infrequent, i.e., if the number of the body motions of the sleeping person detected by the sensor unit 6 during the predetermined period is less than or equal to the reference value.

The optical member 104 is a trough-shaped lens member which covers all the LEDs of the light sources 103 disposed in a ring shape. The optical member 104 is made of a light-transmitting resin such as an acryl resin or the like. In the present embodiment, the optical member 104 is formed of semi-circular trough-shaped lens portions 104a which cover both the outer peripheral LED group 131a and the inner peripheral LED group 131b of the general light source 131 and a hemispherical condensing lens portion 104b which covers the LED group 132a of the condensing light source 132. In the present embodiment, the hemispherical condensing lens portion 104b is configured to change the condensing direction of light. The optical axis of the condensing light source 132 is inclined at a specified angle with respect to the optical axis of the general light source 131.

The cover 5 is identical in configuration with that of the first embodiment. Therefore, no description will be made thereon.

The operation of the illumination device 101 configured as above will now be described with reference to FIGS. 10 and 11. As the user 10 manipulates the remote controller 11a, the illumination device 101 executes a wakeup mode in which the dimming ratios of the light sources 103 are gradually increased at the wakeup time of the user 10 and a sleep mode in which the dimming ratios of the light sources 103 are gradually reduced at the bedtime of the user 10 such that the illumination device 101 is turned off after a predetermined time. A description will now be made on the wakeup mode.

Figure 10:
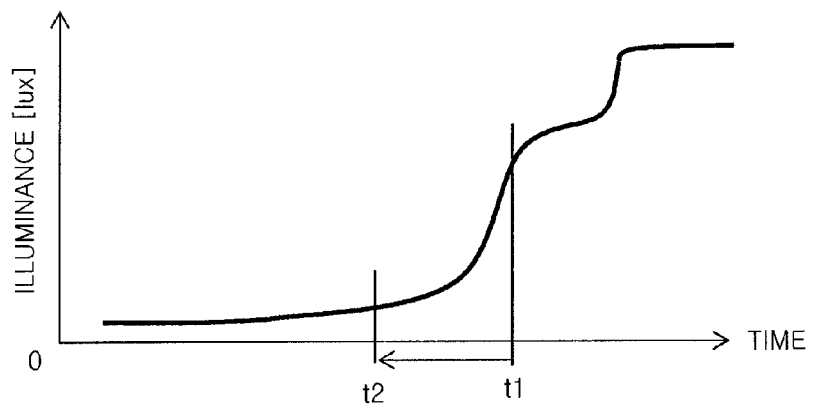
FIG. 10 is a view showing illuminance changes in the illumination device at a user's wakeup time.

Referring to FIG. 10, the user 10 sets a wakeup setting time t1 at which the user 10 wishes to wake up and a wakeup mode startup time t2, thereby setting a pre-wakeup period between the wakeup setting time t1 and the wakeup mode startup time t2. When the turn-on operation of the light sources 103 is controlled in the wakeup mode, as shown in FIG. 10, the control unit 140 gently increases the illuminance at the beginning of the wakeup mode startup time t2 and then sharply increases the illuminance as it is closer to the wakeup setting time t1. If the wakeup setting time t1 is elapsed, the control unit 140 gently increases the illuminance and then sharply increases the illuminance. Upon reaching a predetermined reference illuminance, the control unit 140 keeps the illuminance constant.

Figure 11A:
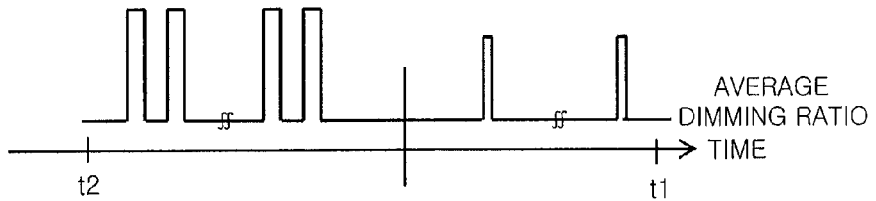
FIG. 11A is a view showing a change pattern of a dimming ratio during the light stimulus control of the illumination device.
Figure 11B:
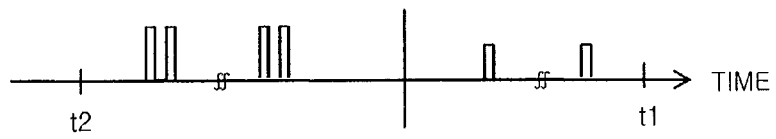
FIG. 11B is a view showing a change pattern of an output ratio of a stimulus sound during the sound stimulus control of the illumination device.

During the pre-wakeup period ranging from the wakeup mode startup time t2 to the wakeup setting time t1, the control unit 140 intermittently executes light stimulus control by which the dimming ratios of the light sources 103 are temporarily made higher than the average dimming ratio in the pre-wakeup period as shown in FIG. 11A. Along with the light stimulus control or in place of the light stimulus control, the control unit 140 intermittently executes sound stimulus control by which the buzzer 140c (the sound source) is caused to output a stimulus sound as shown in FIG. 11B. The sound stimulus control is effective, for example, when the head of the user 10 is covered with the bedding. Thus, the sensor unit 6 may detect whether the head of the user 10 is covered with the bedding, and may execute the sound stimulus control depending on the result of the detection.

As set forth above, in the present embodiment, at least one of the light stimulus control and the sound stimulus control is intermittently executed during the pre-wakeup period. Therefore, even if the sleep of a sleeping person is deep at the wakeup mode startup time t2, it is possible to make the sleep of the sleeping person shallow as the wakeup setting time t1 comes close. As a result, the sleeping person can obtain a comfortable awakening feeling through a light stimulus using the illumination light.

In the light stimulus control, the light having a high color temperature is irradiated from the respective light sources 103. This makes it possible to give a good psychological effect to the user 10 at the wake-up time of the user 10. The light stimulus control is performed by the condensing light source 132. This makes it easy to secure the illuminance on the face of a sleeping person. It is therefore possible to effectively shallow the sleep of the user 10 in the pre-wakeup period. Even if the illumination device 101 is not provided with the condensing light source 132, the sleep of the user 10 can be made shallow by allowing the general light source 131 to irradiate light having a high color temperature.

As shown in FIG. 11A, the control unit 140 may change the dimming ratio of the light sources 103 (the condensing light source 132) in the light stimulus control or the execution time or frequency of the light stimulus control depending on the depth of sleep of the user 10 detected by the sensor unit 6. Furthermore, the control unit 140 may change the output of the stimulus sound in the sound stimulus control or the execution time or frequency of the sound stimulus control. That is to say, when the sleep of the user 10 is deep, a strong stimulus is applied to the user 10 in order to effectively shallow the sleep of the user 10 until the wakeup setting time t1. When the sleep of the user 10 is shallow, a weak stimulus is applied to the user 10 such that the user 10 can obtain a comfortable awakening feeling with low stresses.

The present invention is not limited to the embodiment described above but may be differently modified. In the embodiment described above, there has been illustrated a configuration in which the LEDs are used as the light sources 103. Instead of using the LEDs, it may be possible to use a module configured by solid light-emitting elements other than the LEDs, such as an organic EL element (OLED) or an inorganic EL element. Furthermore, instead of the remote controller 11a, it may be possible to use an information communication terminal such as a smartphone, a tablet terminal or the like. In this case, the illumination device 101 constitutes a part of an illumination system provided with an information communication terminal.

An illumination device according to a third embodiment of the present invention will now be described with reference to FIGS. 12 to 17. Components identical with those of the first embodiment or the second embodiment will be designated by like reference symbols with no detailed description made thereon. As shown in FIG. 12, the illumination device 201 of the present embodiment is a ceiling-light-type illumination device attached to a ceiling surface Ce (or an installation surface). As illustrated in FIG. 12, the illumination device 201 is suitably used in a bedroom where a bed Be is positioned. The illumination device 201 irradiates light on a region B including a wall surface Wa and a region C including a floor surface F1. Regions A, B and C may overlap with one another. For example, the region A may include not only a ceiling surface Ce but also a specified portion of the wall surface Wa which adjoins the ceiling surface Ce. Furthermore, the region B may include not only the wall surface Wa but also a specified portion of the ceiling surface Ce which adjoins the wall surface Wa or a portion of the floor surface F1. Moreover, the region C may include not only the floor surface F1 but also a specified portion of the wall surface Wa which adjoins the floor surface F1. The region C may be a portion of the floor surface F1.

The turn-on operation of the illumination device 201 can be controlled by a user 10 (10a or 10b) who manipulates a remote controller 11a. The illumination device 201 of the present embodiment may be realized by an illumination device other than a ceiling light. The illumination device 201 may be realized by, e.g., a base-light, a down-light or a spot-light, as long as they can irradiate light on the respective regions mentioned above.

The region B is divided into a plurality of regions, e.g., a region B1 of the wall surface Wa adjoining the ceiling surface Ce, a region B2 including an average sight-line height obtained when the user 10a is upright, and a region B3 adjoining the floor surface F1. The illumination device 201 can irradiate light on the respective sections. The region B varies depending on the height of the ceiling or the area of the indoor space. For example, the region B1 refers to a range of about 50 cm from the ceiling surface Ce. The region B3 refers to a range of about 40 cm from the floor surface F1, which is decided by the height of the bed Be on which the user 10 sleeps. The region B2 refers to a range interposed between the regions B1 and B3 and includes an average sight-line height which is assumed to be 160 cm when the user 10 is upright. In the present embodiment, there has been described an example in which light is irradiated on the five regions of the indoor area. However, it is only necessary that the illumination device 201 can irradiate light on at least three regions including the ceiling surface Ce, the wall surface Wa and the floor surface F1. The indoor area may be divided into a larger number of regions. The respective regions may overlap with one another within a specified extent.

Figure 13A:
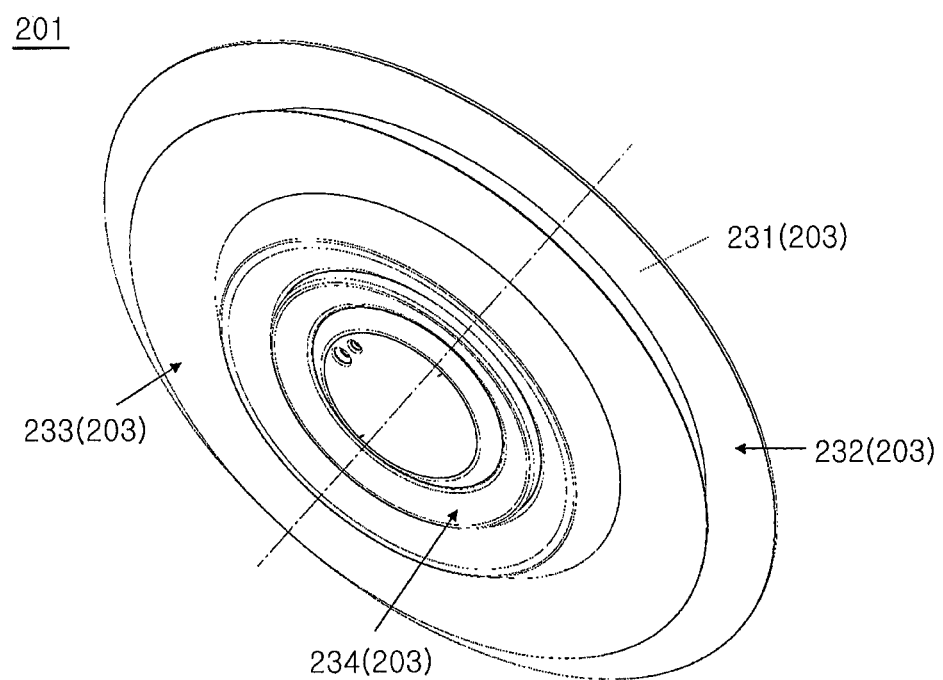
FIG. 13A is a perspective view of the illumination device.
Figure 13B:
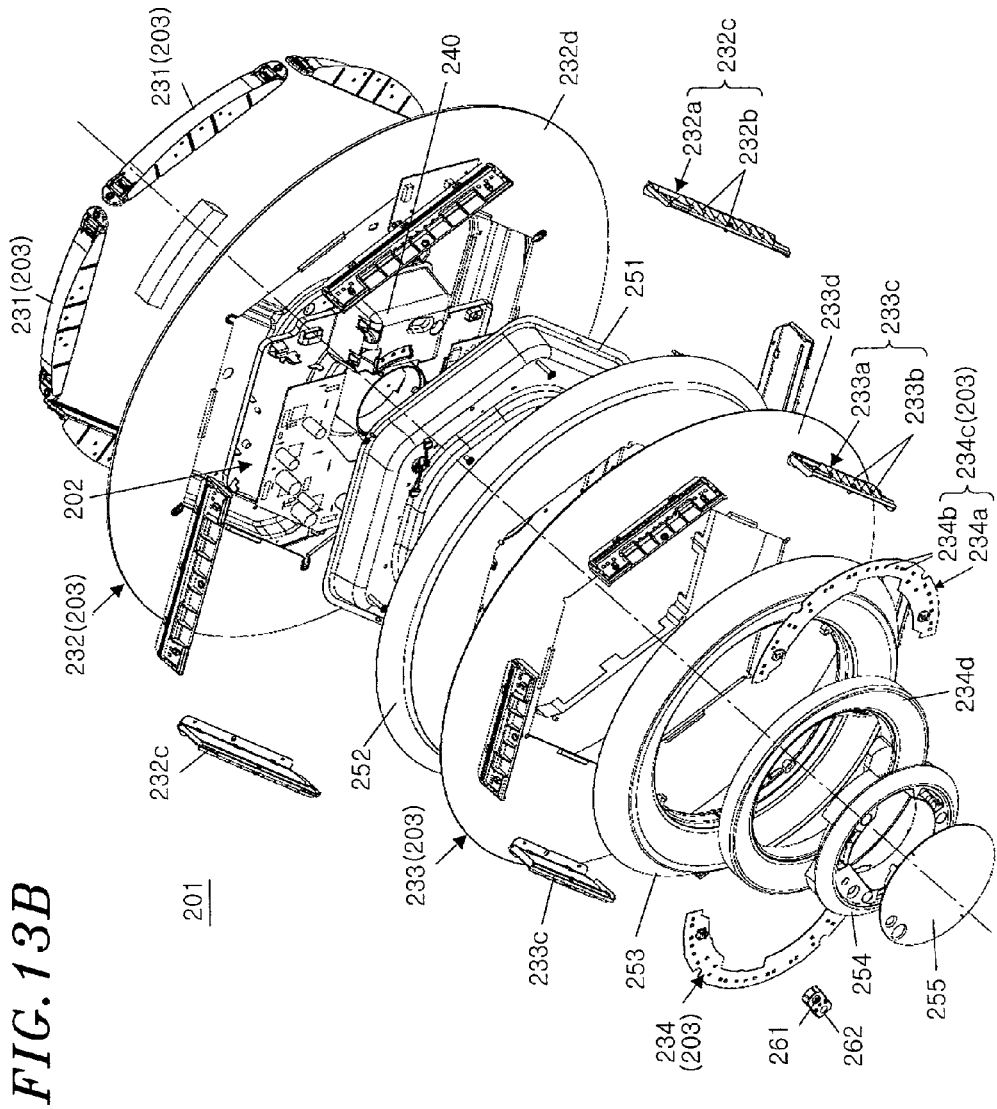
FIG. 13B is an exploded perspective view of the illumination device.
Figure 14A:
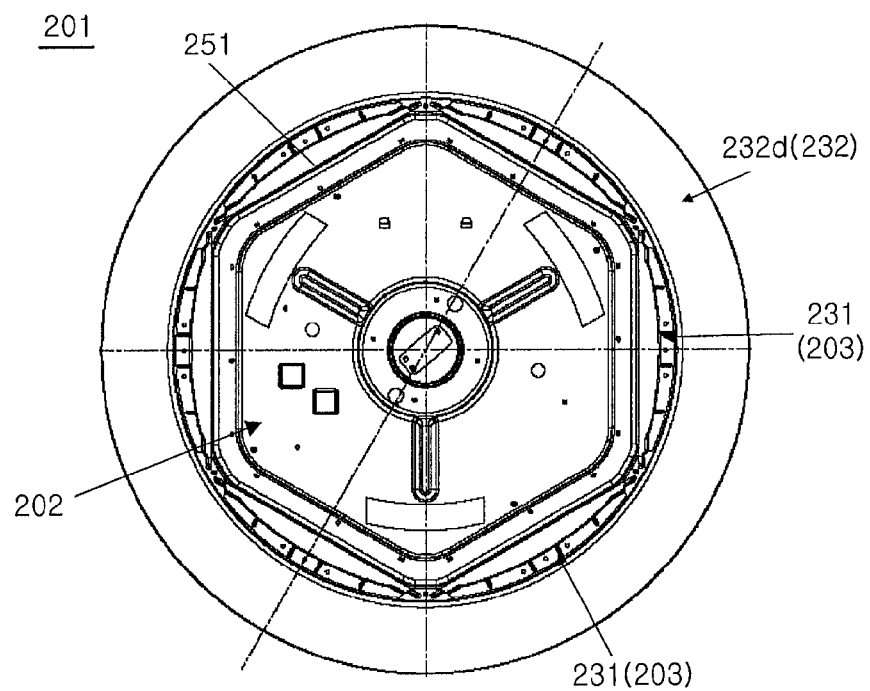
FIG. 14A is a top view of the illumination device.
Figure 14B:
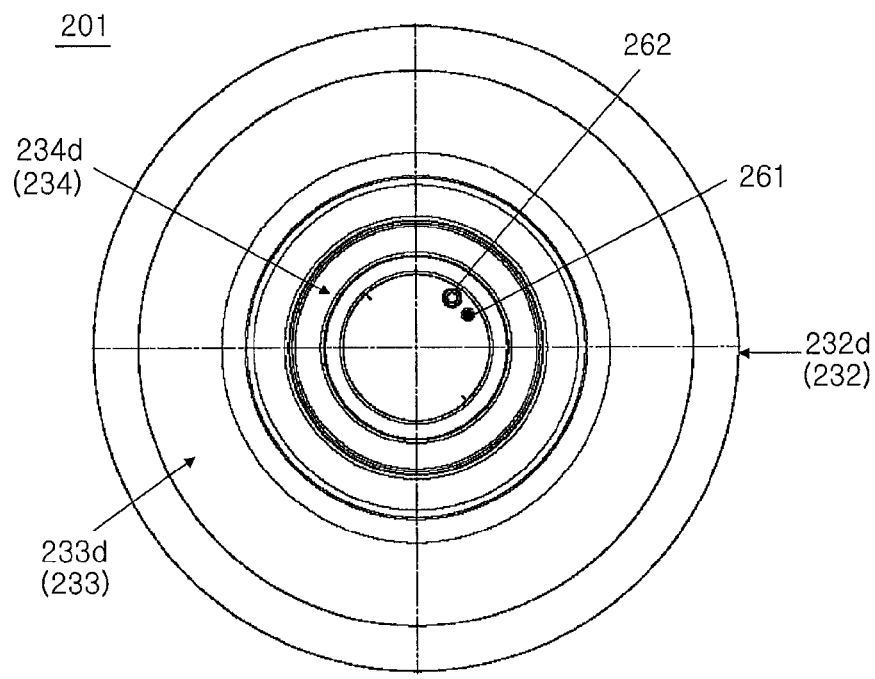
FIG. 14B is a bottom view of the illumination device.

As shown in FIGS. 13 to 15, the illumination device 201 includes a device body 202 attached to an indoor installation surface, a plurality of light sources 203 (231, 232, 233 and 234) provided in the device body 202, and a control unit 240 for controlling the dimming ratios of the respective light sources 203 (see FIG. 13B). The light sources 203 include indirect light sources 231 for irradiating light on the region A (see FIG. 12) including the ceiling surface Ce of the indoor area, general light sources 232 and 233 for irradiating light on the region B including the wall surface Wa, and condensing light sources 234 for irradiating light on the region C including the floor surface F1. The general light sources 232 and 233 include an upper light source 232 for irradiating light on the regions B1 and B2 of the wall surface Wa and a lower light source 233 for irradiating light on the regions B2 and B3 of the wall surface Wa. The general light sources 232 and 233 may be configured by two or more kinds of light sources differing in light distribution characteristic.

The device body 202 is a plate-like member having a hexagonal top-view shape, which is attached to the ceiling surface Ce with the upper surface (attachment surface) thereof facing the ceiling surface Ce. Examples of the device body 202 include a die-cast member having a small thickness and a member formed of an iron plate, an aluminum pate or the like and one-piece molded into a specified shape (see FIG. 14A). Six indirect light sources 231 are provided near the respective sides which form the outer periphery of the device body 202. The control unit 240 is disposed on the lower surface of the device body 202. A mounting bracket (not shown) is provided in the central region of the upper surface of the device body 202 and is connected to a ceiling hook or the like installed on the ceiling surface Ce.

The control unit 240 is provided in the central region of the lower surface of the device body 202. Responsive to a wireless signal received from the remote controller 11a, the control unit 240 turns on or off the respective light sources 203. The term "wireless" used herein includes infrared rays, electric waves and visible light. The control unit 240 performs dimming control of the respective light sources 203 using, e.g., PWM (Pulse Width Modulation) control or analog dimming control. The control unit 240 includes a microcomputer and so forth. The term "dimming ratio" used herein means a ratio of brightness to the maximum brightness of the light sources 203. For example, if the control unit 240 performs dimming control of the light sources 203 using PWM control, the dimming ratio is decided by a duty ratio of a PWM signal.

The control unit 240 is covered by a case 251 having a hexagonal outer periphery (see FIG. 13B). The lower light source 233 is provided on the outer surface of the case 151. A frame 252 is provided between the upper light source 232 and the lower light source 233. The frame 252 maintains a gap between the upper light source 232 and the lower light source 233. Furthermore, a frame 253 is provided between the lower light source 233 and the condensing light sources 234. The frame 253 has a planar portion at the inner periphery side thereof. The condensing light sources 234 are provided on the planar portion of the frame 253. The case 252 and the frames 252 and 253 are made of a metal or a resin having a specified rigidity.

Figure 15A:
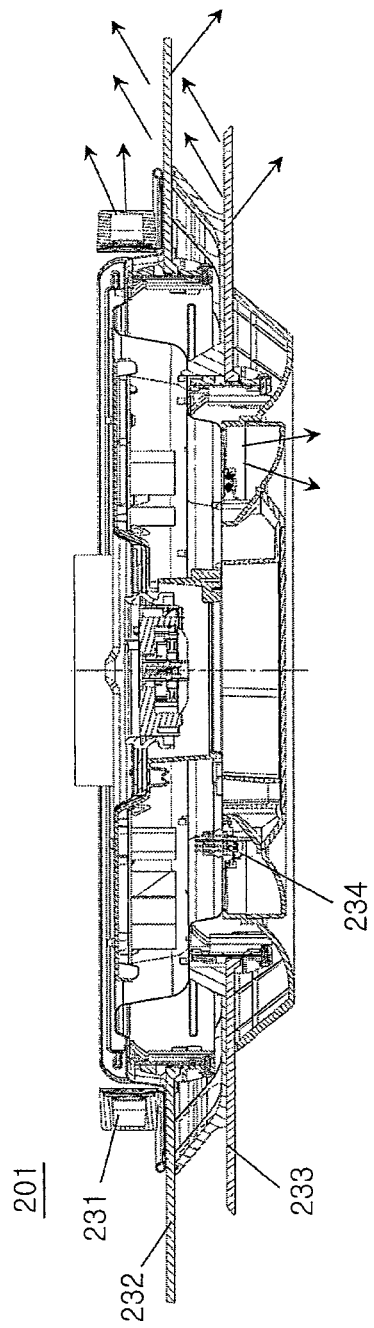
FIG. 15A is a side sectional view of the illumination device.
Figure 15B:
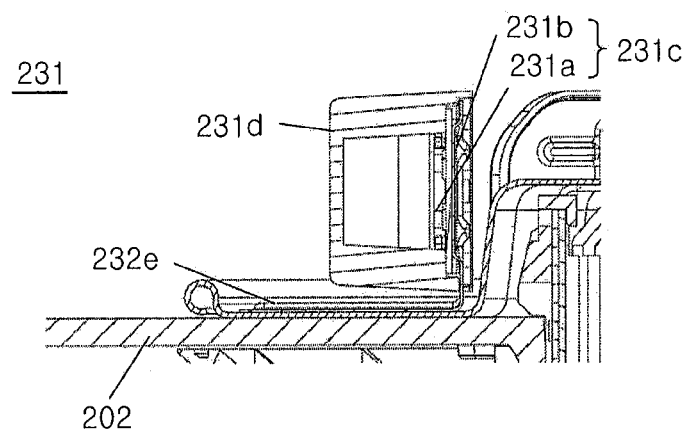
FIG. 15B is an enlarged sectional view of an indirect light source of the illumination device.

Each of the indirect light sources 231 includes an LED unit 231c formed by mounting a plurality of LEDs 231b on a substrate 231a, a case 231d configured to accommodate the LED unit 231c and to radiate the light emitted from the LEDs 231b, and a holding member 231e for fixing each of the indirect light sources 231 to the upper surface of the device body 202 (see FIG. 15B). The substrate 231a may be a resin-based substrate, a ceramic-made substrate or a substrate based on metal such as aluminum or the like. In addition, a flexible substrate or the like may be used as the substrate 231a. For example, GaN-based blue LED chips which emit blue light are used as the LEDs 231b. A mixture of a seal-purpose light-transmitting resin material and a phosphor for the emission of light having a neutral white color or a light bulb color is used as a wavelength converting material.

The substrate 231a is disposed in an orthogonal relationship with the device body 202. When attached to the ceiling surface Ce, the illumination device 201 irradiates light in a direction parallel to the ceiling surface Ce. LED chips which emit light having a relatively-low color temperature of, e.g., 2,500K, are suitably used as the LEDs 231b. The surface of the case 231d facing the substrate 231a is a gentle arc surface. When disposed in an annular shape, six indirect light sources 231 can evenly irradiate light in all directions.

The upper light source 232 includes a plurality of LED units 232c formed by mounting a plurality of LEDs 232b on a substrate 232a, and a light guide plate 232d for guiding and outwardly radiating the light emitted from the LEDs 232b of each of the LED units 232c (see FIGS. 13B and 15A). The substrate 232a and the LEDs 232b are identical with the aforementioned ones. In the present embodiment, six LED units 232c are used. The light guide plate 232d is a disc-shaped light-transmitting plate made of a light-transmitting resin such as an acryl resin or a polycarbonate resin. The inner circumferential surface of the light guide plate 232d is formed into a hexagonal shape. Individual surfaces of the inner circumferential surface serve as incidence surfaces which face the optical axes of the LEDs 232b such that the light is incident on the incidence surfaces. The light incident on the incidence surfaces of the light guide plate 232d is guided outward in the light guide plate 232d while being fully reflected by the inner surface of the light guide plate 232d. The surface of the light guide plate 232d has a light diffusing property. Thus, a part of the guided light is radiated from the outer surface of the light guide plate 232d.

The lower light source 233 includes a plurality of LED units 233c formed by mounting a plurality of LEDs 233b on a substrate 233a, and a light guide plate 233d for guiding and outwardly radiating the light emitted from the LEDs 233b of each of the LED units 233c (see FIG. 13B). The substrate 233a and the LEDs 233b are identical with the aforementioned ones. The lower light source 233 is identical in configuration with the upper light source 232 except that the circumference of the light guide plate 233d of the lower light source 233 is smaller than the circumference of the light guide plate 232d of the upper light source 232. The condensing light sources 234 are fixed by a ring-shaped frame 254 having an opening. A cover 255 is provided in the opening of the frame 254. Hole portions for exposing a signal receiving unit 261 and a human sensor 262 to be described later are formed in the frame 254 and a cover 255.

In the present embodiment, the light is mainly irradiated on the region B1 by increasing the dimming ratio of the upper light source 232 and reducing the dimming ratio of the lower light source 233. On the other hand, the light is mainly irradiated on the region B3 by reducing the dimming ratio of the upper light source 232 and increasing the dimming ratio of the lower light source 233. Furthermore, the light is mainly irradiated on the region B2 by equalizing the dimming ratios of the upper light source 232 and the lower light source 233. The upper light source 232 and the lower light source 233 are not limited to the configuration which makes use of the light guide plate 232d or 233d. Alternatively, the upper light source 232 and the lower light source 233 may be light sources whose light distribution is controlled by an optical member such as a lens or the like so that the light can be irradiated on a specified region. The light emitted from the upper light source 232 and the lower light source 233 may be appropriately diffused by a milky-white cover or the like.

Figure 15C:
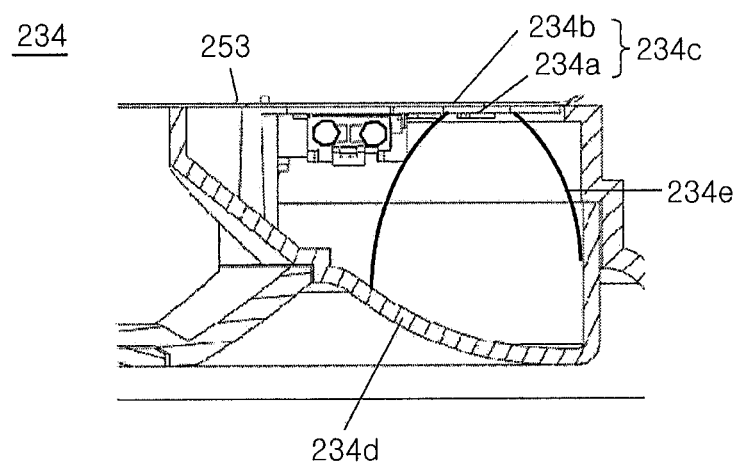
FIG. 15C is an enlarged sectional view of a condensing light source.

Each of the condensing light sources 234 includes a plurality of LED units 234c formed by mounting a plurality of LEDs 234b on a substrate 234a, and a cover 234d for controlling distribution of the light emitted from the LEDs 234b of each of the LED units 234c (see FIGS. 13B and 15C). The substrate 234a and the LEDs 234b are identical with the aforementioned ones. In the present embodiment, two LED units 234c formed by semi-circular substrates 243a are used. The cover 234d is formed into a doughnut shape so as to cover the LED units 234c. The cover 234d is made of a resin material obtained by, for example, adding light-diffusing particles or a pigment to a light-transmitting material such as an acryl resin or the like. The cover 234d may be formed by subjecting the front surface or the rear surface of a transparent glass or resin member to a sandblast process so as to become a rough surface, subjecting the front surface or the rear surface of a transparent glass or resin member to a surface texturing process, or subjecting the front surface or the rear surface of a transparent glass or resin member to a dimple forming process so as to form fine irregularities. As shown in FIG. 15C, the light can be intensively irradiated on the region C by installing a reflection mirror 234e which collects the light emitted from the LEDs 234b.

The color temperature of the light irradiated from the general light sources 232 and 233 and the condensing light sources 234 may range from a daylight color to a light bulb color (from 7,100K to 2,600K). LED chips which emit light of a neutral white color having a color temperature of, e.g., about 5,200K, are suitably used as the LEDs 232b and 233b of the general light sources (the upper light source 232 and the lower light source 233). Furthermore, LED chips which emit light of a daylight color having a color temperature of 5,200K or higher, e.g., 6,500K, are suitably used as the LEDs 234b of the condensing light sources 234.

The illumination device 201 further includes a signal receiving unit 261 for receiving a control signal from the remote controller 11a and a human sensor 262 for detecting the existence of a person who comes close to the illumination device 201. A signal receiving element for making wireless communication with the remote controller 11a using infrared rays is suitably used as the signal receiving unit 261. Alternatively, the signal receiving unit 261 may be an antenna which receives an electric wave signal. A general-purpose small hot-wire-type human sensor is suitably used as the human sensor 262.

Figure 16:
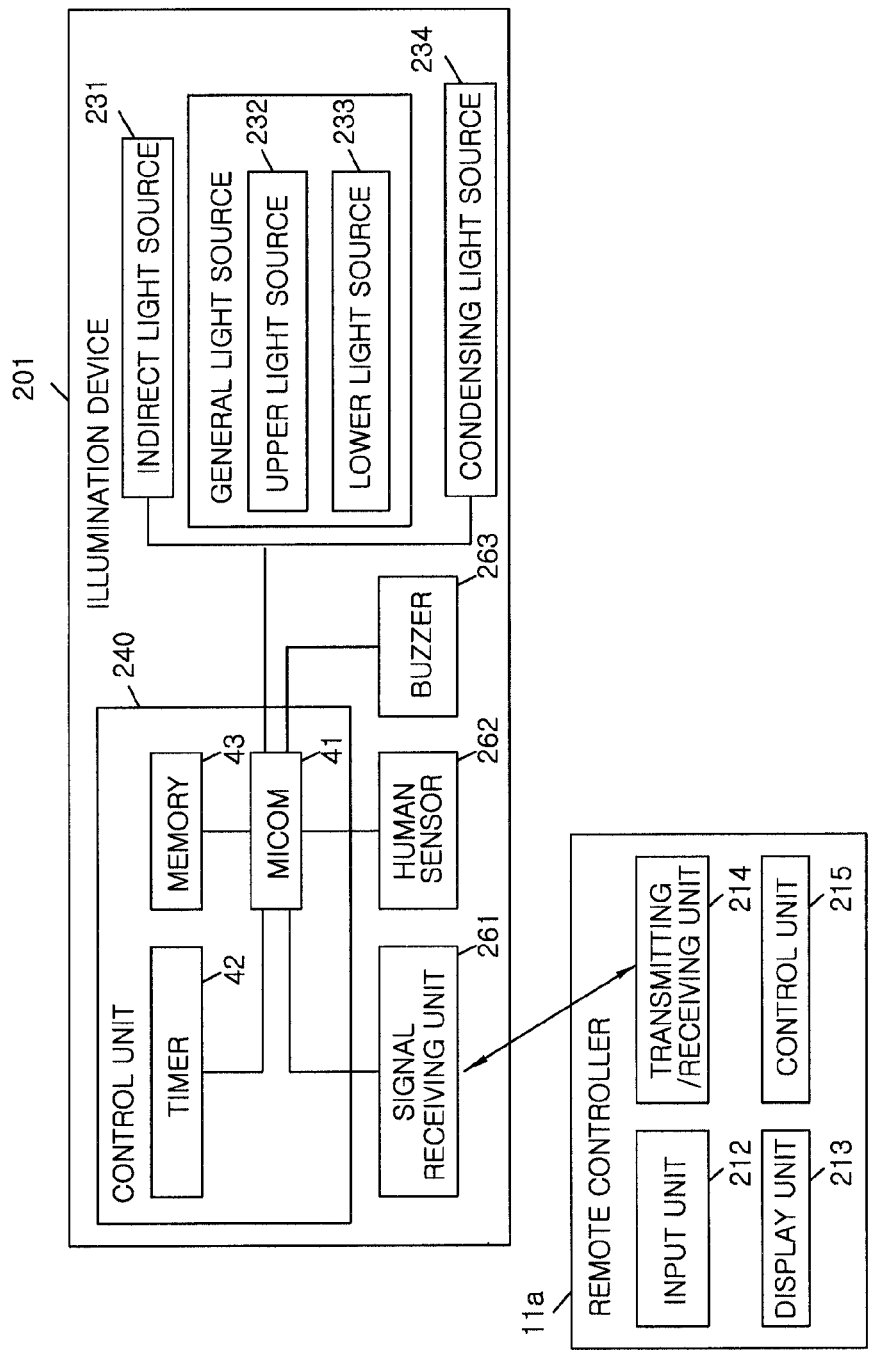
FIG. 16 is a block diagram of the illumination device.

As shown in FIG. 16, the control unit 240 includes a microcomputer 241, a timer 242 for counting a time and a memory 243 for storing data such as the dimming ratios of the respective light sources 203 for the time counted by the timer 242 or the like and the past illumination information. The illumination device 201 further includes a buzzer 264 for outputting a dial tone upon receiving a signal. The buzzer 264 outputs not only the dial tone but also a stimulus sound which shallows the sleep of a sleeping person.

The remote controller 11a includes an input unit 212 for setting a dimming control mode of the illumination device 201 at a bedtime and a wakeup time, a display unit 213 for displaying an input content, and a transceiver unit 214 for making communication with the illumination device 201. The input unit 212 is an input interface and is configured by, e.g., a push-button-type switch or a touch panel. The transceiver unit 214 performs communication using, e.g., an infrared communication method, a communication method of ZigBee (registered trademark) which is one of standards of WPAN (Wireless Personal Area Network), or other communication methods. The remote controller 11a further includes a control unit 215 which accommodates therein a microcomputer for controlling the respective components mentioned above, and a memory.

The operation of the illumination device 201 configured as above will now be described with reference to FIG. 17. As the user 10 manipulates the remote controller 11a, the illumination device 201 executes an awakening mode in which the dimming ratios of the light sources 203 are gradually increased at the wakeup time of the user 10 and a rest mode in which the dimming ratios of the light sources 203 are gradually reduced at the bedtime of the user 10 such that the illumination device 201 is turned off after a predetermined time. In FIG. 17, t0 is an entry time at which the turn-on operation of the illumination device 201 or the detecting operation of the human sensor 262 is triggered. t1 is a rest mode start time which is based on the time inputted into the remote controller by the user 10. t2 is a turn-off time. t3 is an awakening mode start time. t4 is a wakeup setting time. t0, t1, t2, t3 and t4 are inputted and set by the user 10.

In the bedtime period ranging from the user entry time to a predetermined turn-off time, the general light sources 232 and 233 and the condensing light sources 234 are turned off prior to turning off the indirect light sources 231. Furthermore, the general light sources 232 and 233 are turned off prior to turning off the condensing light sources 234. The lower light source 233 is turned off prior to turning off the upper light source 232. Thus, as shown in FIG. 17, the light sources of the indoor area in which the illumination device 201 is installed are turned off in the order of the regions B3, B2, B1, C and A.

In this way, the light irradiated on the wall surface Wa is turned off sequentially from the position close to the floor surface F1. This makes it possible to effectively reduce the illuminance on the face of the user 10 and to obtain a pleasant illumination environment at the sleep time without hindering the sleep with the illumination light. By dimming the light irradiated on the wall surface Wa while maintaining the light irradiated on the ceiling surface Ce, it is possible to realize an illumination environment like indirect light. This makes it possible to obtain a relaxed illumination environment which is dark but good in impression. By maintaining the light irradiated on the floor surface F1, it is possible to obtain dark assistant lighting. By irradiating the light on the ceiling surface Ce and the floor surface F1, it is possible to realize a sharp-conditioned illumination environment. This makes it possible to obtain an illumination environment which is dark but good in impression.

Since the condensing light sources 234 mainly irradiate assistant light on the region C, it is preferable to enable the user 10 to select the turn-on and turn-off of the condensing light sources 234. The present invention is not limited to the operation example described above. The order of dimming or turning off the light irradiated on the wall surface Wa (the regions B1, B2 and B3) may be changed if such a need arises.

The color temperature of the light emitted from the indirect light sources 231 is lower than the color temperature of the light emitted from the general light sources 232 and 233 and the condensing light sources 234. Thus, it is possible to reduce suppression of melatonin secretion of the user 10 at the bedtime of the user 10 and to apply a good psychological effect to the user 10 at the bedtime of the user 10.

In the wakeup period ranging from a predetermined illumination start time to the wakeup time of the user 10, the indirect light sources 231, the general light sources 232 and 233 and the condensing light sources 234 are turned on in this order. The irradiation of light from the general light sources 232 and 233 is started in the order of the region B1, the region B2 and the region B3.

As a result, the turn-on of the light sources 203 is started in the order of the region A, the region B1, the region B2, the region B3 and the region C such that the illumination environment becomes gradually brighter. This enables the user 10 to wake up with a pleasant feeling. Since the light sources 203 are sequentially turned on so as to first illuminate the ceiling surface Ce, it is possible to prevent a sharp increase in the illuminance on the face of a sleeping person. This enables the user 10 to pleasantly wake up at the wakeup setting time.

If the first lighting region is the region A and the last lighting region is the region C, the order of dimming or turning off the light sources 203 which illuminate the wall surface Wa (the regions B1, B2 and B3) may be changed depending on the necessity in order to easily obtain the face illuminance.

A plurality of LEDs differing in color temperature may be included in the LEDs provided on the substrate of each of the light sources 203. The color temperature of the irradiated light may be variable. In the wakeup period ranging from a predetermined illumination start time to the wakeup time of the user 10, the light sources 203 may irradiate light having a color temperature higher than the color temperature of the light irradiated in a bedtime period ranging from the entry time of the user 10 to a predetermined turn-off time. By doing so, it is possible to apply a good psychological effect to the user 10 at the wakeup time of the user 10.

The present invention is not limited to the embodiment described above but may be differently modified. In the embodiment described above, there has been illustrated a configuration in which the LEDs are used as the light sources 103. Instead of using the LEDs, it may be possible to use a module configured by solid light-emitting elements other than the LEDs, such as an organic EL element (OLED) or an inorganic EL element. Furthermore, instead of the remote controller 11a, it may be possible to use an information communication terminal such as a smartphone, a tablet terminal or the like. In this case, the illumination device 201 constitutes a part of an illumination system provided with an information communication terminal.

The above-described embodiments may be appropriately combined as long as they do not conflict with each other.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teaching.

What is claimed is:

1. An illumination system, comprising:
an illumination device configured to irradiate light;
a control unit configured to control a turn-on operation of the illumination device; and
a terminal through which manipulation information of the illumination device is inputted by a user, wherein the illumination device is configurable in illuminance and color temperature of the irradiated light,
the control unit includes a memory unit configured to store the manipulation information and operation information of the illumination device therein, the operation information including the color temperature, illuminance and irradiation time of the illumination device, an information extracting unit configured to extract illumination information, within a period between a first moment prior to a falling-asleep time of the user and a second moment after a wakeup time of the user, from the manipulation information and the operation information of the illumination device stored in the memory unit, and an information transceiver unit configured to transmit and receive the illumination information to and from the terminal, and
the terminal includes a terminal transceiver unit configured to transmit and receive the illumination information to and from the control unit, a display unit configured to display the illumination information received through the terminal transceiver unit and an input unit by which the manipulation information is inputted.

2. The illumination system of claim 1, wherein the display unit is configured to display at least one of an average value, a median value, a mode value and a cumulative value of the illumination information on the basis of an arbitrary period.

3. The illumination system of claim 1, wherein the information extracting unit is configured to calculate a pre-falling-asleep light quantity, as the illumination information, from the operation information before the falling-asleep time of the user, and the display unit is configured to display the pre-falling-asleep light quantity.

4. The illumination system of claim 1, wherein the information extracting unit is configured to calculate a post-wakeup light quantity, as the illumination information, from the operation information after the wakeup time of the user, and the display unit is configured to display the post-wakeup light quantity.

5. The illumination system of claim 1, wherein the control unit is configured to control the illumination device in a wakeup control mode in which a dimming ratio of the illumination device is gradually increased from a wakeup setting time set by the user, and the display unit is configured to display the wakeup setting time as the illumination information.

6. The illumination system of claim 5, further comprising:
a sensor unit configured to detect a body motion of the user,
wherein the control unit determines whether the user is in an awake phase or a sleep phase and the wakeup time of the user based on the body motion of the user detected by the sensor unit, the information extracting unit is configured to extract an awakening comfort level of the user based on a time difference between the wakeup setting time and the wakeup time, and the display unit is configured to index and display the awakening comfort level as the illumination information.

7. The illumination system of claim 6, wherein the information extracting unit is configured to extract the awakening comfort level based on the number of the body motion detected by the sensor unit during a period ranging from the wakeup setting time to the wakeup time of the user, and the display unit is configured to index and display the awakening comfort level as the illumination information.

8. The illumination system of claim 7, wherein the display unit is configured to display the wakeup time of the user, as the illumination information.

9. The illumination system of claim 6, wherein the control unit is configured to control the illumination device in a falling-asleep control mode in which a dimming ratio of the illumination device is gradually decreased from a turn-off manipulation time inputted by the user such that the illumination device is turned off at a turn-off time being a predetermined time after the turn-off manipulation time, and the display unit is configured to display, as the illumination information, at least one of the turn-on duration and the turn-on frequency of the illumination device during a period ranging from an end time of the falling-asleep control mode to the wakeup time of the user.

10. The illumination system of claim 1, wherein the control unit is configured to control the illumination device in a falling-asleep control mode in which a dimming ratio of the illumination device is gradually decreased from a turn-off manipulation time inputted by the user such that the illumination device is turned off at a turn-off time being a predetermined time after the turn-off manipulation time, and the display unit is configured to display the turn-off time of the illumination device as the illumination information.

11. The illumination system of claim 10, further comprising:
a sensor unit configured to detect a body motion of the user,
wherein the control unit determines the falling-asleep time of the user based on the body motion of the user detected by the sensor unit, the information extracting unit is configured to extract a falling-asleep comfort level of the user during a period ranging from a start time of the falling-asleep control mode to the falling-asleep time of the user, and the display unit is configured to index and display the falling asleep comfort level as the illumination information.

12. The illumination system of claim 1, wherein the input unit allows the user to input a sleep feeling felt at the wakeup time.

13. The illumination system of claim 1, wherein the terminal transceiver unit is connected to an external terminal via the Internet.

14. An illumination device, comprising:
a light source configured to irradiate light;
a control unit configured to control a turn-on operation of the light source; and
a sound source configured to output a stimulus sound,
wherein the illumination device is configured to gradually increase a dimming ratio of the light source in a pre-wakeup period between a predetermined time earlier than a wakeup setting time and the wakeup setting time, and
the control unit is configured to, during the pre-wakeup period, intermittently execute at least one of light stimulus control in which the dimming ratio of the light source is made higher, for a predetermined period within the pre-wakeup period, than an average dimming ratio in the pre-wakeup period and sound stimulus control in which the sound source is caused to output the stimulus sound.

15. The illumination device of claim 14, wherein the light source is configurable in a color temperature of the light irradiated, and the control unit is configured to cause the light source to irradiate light having an increased color temperature during the light stimulus control.

16. The illumination device of claim 14, wherein the light source includes a general light source for irradiating light on an indoor region and a condensing light source for irradiating light on a part of the indoor region, and the color temperature of the light irradiated by the condensing light source is higher than the color temperature of the light irradiated by the general light source.

17. The illumination device of claim 14, further comprising:
a sensor unit configured to detect a body motion of a user for the pre-wakeup period,
wherein the control unit is configured to execute at least one of the light stimulus control and the sound stimulus control when the number of the body motion detected by the sensor unit is less than or equal to a reference value.

18. The illumination device of claim 17, wherein the control unit is configured to change at least one of the dimming ratio of the light source during the light stimulus control, an execution duration of the light stimulus control, and an execution frequency of the light stimulus control depending on the number of body motion detected by the sensor unit.

19. The illumination device of claim 17, wherein the control unit is configured to change at least one of the output of the stimulus sound during the sound stimulus control, an execution duration of the sound stimulus control, and an execution frequency of the sound stimulus control depending on the number of the body motion detected by the sensor unit.

20. An illumination device, comprising:
a light source configured to irradiate light; and
a control unit configured to control a turn-on operation of the light source,
wherein the illumination device is configured to gradually increase a dimming ratio of the light source in a pre-wakeup period between a predetermined time earlier than a wakeup setting time and the wakeup setting time, and
the control unit is configured to, during the pre-wakeup period, intermittently execute light stimulus control in which the dimming ratio of the light source is made higher, for a predetermined period within the pre-wakeup period, than an average dimming ratio in the pre-wakeup period.

21. An illumination device, comprising:
a device body attached to an installation surface of an indoor area;
a plurality of light sources provided in the device body; and
a control unit configured to control dimming ratios of the light sources,
wherein the control unit is configured to control turn-on operations of the light sources so as to individually irradiate light on a first region including an indoor ceiling surface, a second region including a wall surface and a third region including a floor surface, pursuant to a predetermined time schedule.

22. The illumination device of claim 21, wherein the light sources include an indirect light source for irradiating light on the first region, a general light source for irradiating light on the second region, and a condensing light source for irradiating light on the third region.

23. The illumination device of claim 22, wherein, during a bedtime period ranging from a user entry time at which the user enters a bedroom to a predetermined turn-off time, the control unit is configured to turn off the general light source and the condensing light source prior to turning off the indirect light source.

24. The illumination device of claim 23, wherein the control unit is configured to turn off the general light source prior to turning off the condensing light source.

25. The illumination device of claim 21, wherein, during a wake-up period ranging from a predetermined illumination start time to a user wakeup time, the control unit is configured to turn on the indirect light source, the general light source and the condensing light source in this order.

26. The illumination device of claim 21, wherein the general light source is configured to irradiate light on a plurality of regions defined by dividing the second region.

27. The illumination device of claim 26, wherein the plurality of regions includes a first sub-region adjoining the ceiling surface, a second sub-region including an average sight-line height obtained when the user is upright, and a third sub-region adjoining the floor surface.

28. The illumination device of claim 27, wherein, during a bedtime period ranging from a user entry time at which the user enters a bedroom to a predetermined turn-off time, the control unit is configured to stop irradiation of light from the general light source on the third sub-region, the second sub-region and the first sub-region in this order.

29. The illumination device of claim 27, wherein, during a wake-up period ranging from a predetermined illumination start time to a user wakeup time, the control unit is configured to allow light from the general light source to be irradiated on the first sub-region, the second sub-region and the third sub-region in this order.

30. The illumination device of claim 21, wherein the color temperature of the light irradiated by the indirect light source is lower than the color temperature of the light irradiated by each of the general light source and the condensing light source.

31. The illumination device of claim 21, wherein the light sources are configurable in their color temperatures of the light irradiated, and the control unit is configured to, during a wakeup period ranging from a predetermined illumination start time to a user wakeup time, cause the light sources to irradiate light having the color temperatures higher than those of the light irradiated during a bedtime period ranging from a user entry time at which the user enters a bedroom to a predetermined turn-off time.

* * * * *